US011865060B2

(12) United States Patent
Inada

(10) Patent No.: US 11,865,060 B2
(45) Date of Patent: Jan. 9, 2024

(54) TREATMENT UNIT AND MASSAGE MACHINE

(71) Applicant: FAMILY INADA CO., LTD., Osaka (JP)

(72) Inventor: Nichimu Inada, Osaka (JP)

(73) Assignee: FAMILY INADA CO., LTD., Osaka (JP)

( * ) Notice: Subject to any disclaimer, the term of this patent is extended or adjusted under 35 U.S.C. 154(b) by 930 days.

(21) Appl. No.: 16/260,819

(22) Filed: Jan. 29, 2019

(65) Prior Publication Data

US 2019/0231634 A1 Aug. 1, 2019

(30) Foreign Application Priority Data

Jan. 31, 2018 (JP) ................................. 2018-015039

(51) Int. Cl.
*A61H 7/00* (2006.01)
*A61H 15/00* (2006.01)
(Continued)

(52) U.S. Cl.
CPC ......... *A61H 15/0078* (2013.01); *A61H 7/004* (2013.01); *A61H 7/007* (2013.01); *A61H 9/0078* (2013.01); *A61H 23/006* (2013.01); *A61H 23/04* (2013.01); *A61H 2015/0014* (2013.01); *A61H 2023/0272* (2013.01); *A61H 2201/0103* (2013.01); *A61H 2201/0149* (2013.01); *A61H 2201/1207* (2013.01); *A61H 2201/1215* (2013.01); *A61H 2201/149* (2013.01); *A61H 2201/1418* (2013.01);
(Continued)

(58) Field of Classification Search
CPC .... A61H 2201/0149; A61H 2201/1623; A61H 2201/1614; A61H 2201/1609; A61H 2205/062; A61H 2205/081
See application file for complete search history.

(56) References Cited

U.S. PATENT DOCUMENTS 2,990,720 A * 7/1961 Scholtes ................. F16H 35/16
74/42
4,009,710 A * 3/1977 Inada ................. A61H 23/0254
601/108
(Continued)

FOREIGN PATENT DOCUMENTS

| | | |
|---|---|---|
| CN | 2765603 Y | 3/2006 |
| CN | 203029587 U | 7/2013 |

(Continued)

OTHER PUBLICATIONS

English translation of Morita (JP-2012010854-A). (Year: 2012).*
(Continued)

*Primary Examiner* — Justine R Yu
*Assistant Examiner* — Christopher E Miller
(74) *Attorney, Agent, or Firm* — Michael Best & Friedrich LLP

(57) ABSTRACT

A treatment unit includes a treatment part including a treatment element, a first drive unit including a swash plate eccentric cam and a second drive unit including an eccentric cam. One of the first drive unit and the second drive unit is connected to the treatment part, and the other one of the first drive unit and the second drive unit is connected to the one of the first drive unit and the second drive unit.

10 Claims, 16 Drawing Sheets

(51) Int. Cl.

| | |
|---|---|
| ***A61H 23/00*** | (2006.01) |
| ***A61H 23/04*** | (2006.01) |
| ***A61H 9/00*** | (2006.01) |
| *A61H 23/02* | (2006.01) |

(52) U.S. Cl.

CPC ................ *A61H 2201/1427* (2013.01); *A61H 2201/1436* (2013.01); *A61H 2201/1481* (2013.01); *A61H 2201/1614* (2013.01); *A61H 2201/1623* (2013.01); *A61H 2201/1661* (2013.01); *A61H 2201/1669* (2013.01); *A61H 2201/1676* (2013.01); *A61H 2201/1678* (2013.01); *A61H 2201/5053* (2013.01); *A61H 2203/0431* (2013.01); *A61H 2205/062* (2013.01); *A61H 2205/081* (2013.01); *A61H 2205/106* (2013.01); *A61H 2205/108* (2013.01)

(56) References Cited

U.S. PATENT DOCUMENTS

| | | | | |
|---|---|---|---|---|
| 6,200,282 | B1 * | 3/2001 | Furuie | A61H 23/006 601/108 |
| 6,585,668 | B2 * | 7/2003 | Nissim | A61H 7/001 601/134 |
| 2002/0177796 | A1 * | 11/2002 | Suh | A61H 7/001 601/84 |
| 2002/0183665 | A1 * | 12/2002 | Suh | A61H 7/001 601/84 |
| 2005/0015029 | A1 * | 1/2005 | Kim | A61H 15/0078 601/102 |
| 2005/0020946 | A1 * | 1/2005 | Kim | A61H 7/004 601/99 |
| 2005/0059912 | A1 * | 3/2005 | Ishiguro | A61H 15/0078 601/90 |
| 2007/0299377 | A1 | 12/2007 | Shiraishi | |
| 2010/0081972 | A1 * | 4/2010 | Kan | 601/99 |
| 2012/0010049 | A1 * | 1/2012 | Amalaha | A61H 23/0254 482/4 |
| 2017/0258673 | A1 | 9/2017 | Inada et al. | |

FOREIGN PATENT DOCUMENTS

| | | | | | |
|---|---|---|---|---|---|
| CN | 203354860 | U | | 12/2013 | |
| DE | 20006118 | U1 | * | 5/2000 | A61H 7/004 |
| JP | S59-172424 | U | | 11/1984 | |
| JP | H07323052 | A | * | 12/1995 | |
| JP | H08308897 | A | * | 11/1996 | |
| JP | 2005-046541 | A | | 2/2005 | |
| JP | 2008-136573 | A | | 6/2008 | |
| JP | 2012-120549 | A | | 6/2012 | |
| JP | 2015-181850 | A | | 10/2015 | |
| JP | 2016-198371 | A | | 12/2016 | |
| KR | 20020082322 | A | * | 10/2002 | |
| TW | 2016-151172 | A | | 5/2016 | |
| WO | 2014027494 | A1 | | 2/2014 | |

OTHER PUBLICATIONS

English translation of Morita (JP-H09299432-A) (Year: 1997).*

English translation of Morita (JP-2012157480-A) (Year: 2012).*

English translation of Inada (JP-2012120549-A) (Year: 2012).*

English translation of Ishikawa (WO-2014027494-A1) (Year: 2014).*

Office Action in Japanese Application No. 2018-015039, dated Nov. 9, 2021.

Office Action in Chinese Application No. 201910048438.X, dated Apr. 6, 2022.

Office Action in Chinese Application No. 201910048438.X, dated Oct. 10, 2022.

Article 94(3) EPC communication issued in European Application No. 19154533.4-1126, dated Jul. 3, 2020.

Search Report issued in European Application No. 19154533.4-1126, dated Apr. 26, 2019.

Office Action Issued in Taiwan Application No. 11020461390, dated May 17, 2020.

* cited by examiner

TREATMENT UNIT AND MASSAGE MACHINE

This application claims Paris Convention priority based on Japanese Patent Application No. 2018-015039 filed on Jan. 31, 2018, the contents of which are incorporated herein by reference in their entirety.

TECHNICAL FIELD

The present invention relates to a treatment unit and a massage machine using the treatment unit.

BACKGROUND ART

A massage machine is known which performs treatment by pinching a shoulder of a treatment receiver so as to knead and pat the shoulder. For example, Japanese Patent Application Publication (Kokai) No. 2005-046541 discloses a massage machine (stationary type massage apparatus) as follows. The massage machine has a massage mechanism which has shoulder kneading means for causing a pair of kneading hands to pinch front and rear portions of respective right and left shoulders of the treatment receiver who rests at a supine position, and which realizes movement for the pair of kneading hands to move close to or move away from the front and rear portions of the shoulder.

Japanese Patent Application Publication (Kokai) No. 2012-120549 discloses a massage machine that has a first arm and a second arm, both of which are arranged at an interval therebetween and pinch the shoulder of the treatment receiver in tip contact portions by moving close to or moving away from each other, and that has a rotary shaft rotatably attached to the first arm and the second arm in order to change the interval between the first arm and the second arm. In the massage machine, at least one of the first arm and the second arm is eccentrically and obliquely attached to the rotary shaft.

SUMMARY OF THE INVENTION

This invention relates to a treatment unit that includes a treatment part including a treatment element, a first drive unit including a swash plate eccentric cam and a second drive unit including an eccentric cam. One of the first drive unit and the second drive unit is connected to the treatment part, and the other one of the first drive unit and the second drive unit is connected to the one of the first drive unit and the second drive unit.

The treatment part may be connected to the swash plate eccentric cam. The first drive unit may be connected to the eccentric cam. An operation of the eccentric cam may be transmitted to the treatment part via the first drive unit. The swash plate eccentric cam and the eccentric cam each independently may include a drive source.

The treatment unit may further include a third drive unit that moves the treatment part in a direction perpendicular to an eccentric direction. The third drive unit may be connected to at least one of the first drive unit and the second drive unit.

The treatment part may include a first treatment element and a second treatment element, the first and the second treatment elements can move close to and can move away from each other.

DESCRIPTION OF THE INVENTION

Figure 1:
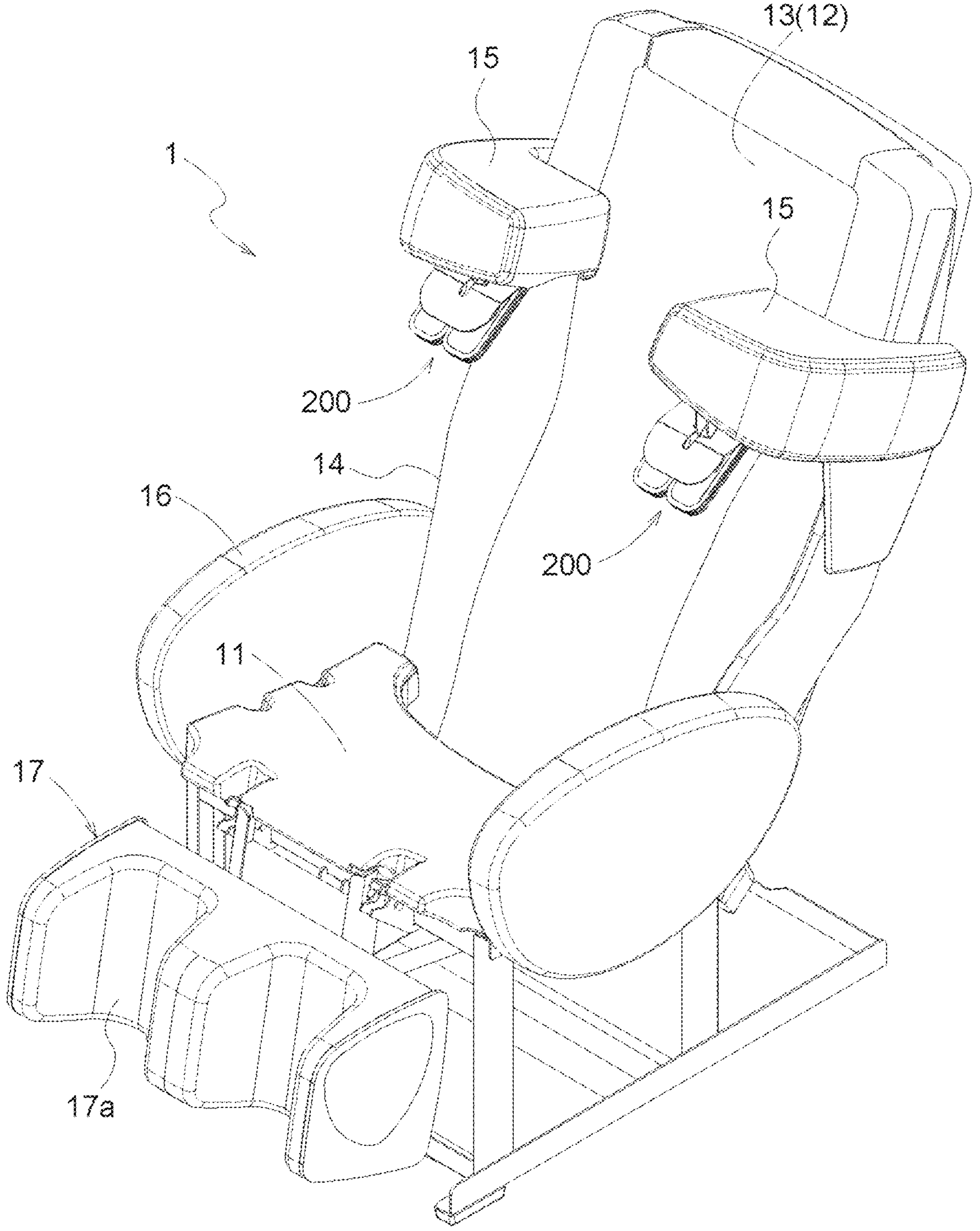
FIG. 1 is a perspective view illustrating an overall configuration of a massage machine.

In a massage machine, a mechanical operation substitutes a massage action performed on a treatment receiver by a person (treatment giver). Therefore, for example, in a case where treatment is performed on a shoulder as a treatment target site, if the massage machine reproduces movements of arms or fingers when the treatment giver kneads the shoulder of the treatment receiver, it is considered that the massage action performed by the treatment giver can be substituted with the mechanical operation of the massage machine. For example, when the treatment giver stimulates gall bladder (GB) 21 which is an acupressure point of the shoulder of the treatment receiver, it is preferable to perform the treatment by pressing (performing acupressure on) the front portion of the shoulder of the treatment receiver with a thumb from above the shoulder while the treatment giver holds the front portion of the shoulder of the treatment receiver with his or her own four fingers. In order to further improve a treatment effect, when the front portion is pressed with the thumb, it is preferable that a movement of an arm or an elbow of the treatment giver, that is, displacement along a direction intersecting a pressing direction is applied via the thumb to the shoulder of the treatment receiver.

In this way, a treatment unit and a massage machine using the treatment unit have been demanded. When a treatment element performs the treatment by pressing a treatment target site, the treatment unit performs the treatment while the displacement along the direction intersecting the pressing direction is further applied to the treatment target site.

The present invention is made in view of the above-described circumstances, and an object thereof is to provide a treatment unit and a massage machine using the treatment unit. When a treatment element performs treatment by pressing a treatment target site, the treatment unit performs the treatment while displacement along a direction intersecting a pressing direction is further applied to the treatment target site.

In order to achieve the above-described object, a characteristic configuration of a treatment unit according to the present invention includes a treatment part having a treatment element, a first drive unit having a swash plate eccentric cam, and a second drive unit having an eccentric cam. Any one drive unit of the first drive unit and the second drive unit is connected to the treatment part, and the other drive unit of the first drive unit and the second drive unit is connected to the one drive unit.

According to the above-described configuration, while the treatment part having the treatment element is caused to oscillate in a pressing direction by the first drive unit, the treatment element can be greatly displaced in a direction intersecting the pressing direction by the second drive unit. Therefore, it is possible to provide the following treatment unit. When the treatment element performs treatment by pressing a treatment target site, the treatment unit performs the treatment while displacement along the direction intersecting the pressing direction is further applied to the treatment target site.

That is, according to the above-described configuration, any one drive unit of the first drive unit and the second drive unit is connected to the treatment part. The other drive unit of the first drive unit and the second drive unit is connected to the one drive unit. Accordingly, any one displacement operation of the first drive unit and the second drive unit is transmitted to the treatment part directly or indirectly via the other drive unit. Therefore, the first drive unit having the swash plate eccentric cam causes the treatment part to oscillate in the pressing direction. In this case, the treatment part can be greatly displaced in the direction intersecting the pressing direction by the second drive unit having the eccentric cam.

For example, in a case where the treatment is performed on a shoulder of a treatment receiver as a treatment target site, the treatment element presses the shoulder from above while the treatment element is caused to oscillate in an upward-downward direction by the first drive unit. Furthermore, the treatment element is greatly displaced in a horizontal direction by the second drive unit. In this manner, a twisting effect can be applied to the pressing operation. Therefore, a treatment effect can be improved.

In another characteristic configuration of the treatment unit according to the present invention, the treatment part may be connected to the swash plate eccentric cam. The first drive unit may be connected to the eccentric cam. An operation of the eccentric cam may be transmitted to the treatment part via the first drive unit.

According to the above-described configuration, the treatment part is connected to the swash plate eccentric cam of the first drive unit, and is caused to oscillate in the pressing direction by the swash plate eccentric cam. Furthermore, the first drive unit is connected to the eccentric cam of the second drive unit. Accordingly, the operation of the eccentric cam is transmitted to the treatment part via the first drive unit. In this manner, the treatment part is greatly displaced in the direction intersecting the pressing direction together with the first drive unit.

In still another characteristic configuration of the treatment unit according to the present invention, the swash plate eccentric cam and the eccentric cam may each independently have a drive source.

According to the above-described configuration, the swash plate eccentric cam and the eccentric cam can be respectively and independently operated. That is, when the treatment element performs the treatment by pressing the treatment target site, the pressing operation and the displacement operation along the direction intersecting the pressing direction are respectively and independently performed. In this manner, it is possible to realize a complex and delicate movement like a movement of arms or fingers of the treatment giver. Therefore, a treatment effect can be improved.

Still another characteristic configuration of the treatment unit according to the present invention may further include a third drive unit that moves the treatment part in a direction perpendicular to an eccentric direction. The third drive unit may be connected to at least any one of the first drive unit and the second drive unit.

According to the above-described configuration, the third drive unit can move the treatment part in the direction perpendicular to the eccentric direction via the first drive unit or the second drive unit.

In still another characteristic configuration of the treatment unit according to the present invention, as the treatment element, the treatment part may have a first treatment element and a second treatment element which can move close to and can move away from each other.

According to the above-described configuration, the first treatment element and the second treatment element are moved close to or are moved away from each other. In this manner, it is possible to perform the treatment corresponding to a kneading action performed by the fingers of the treatment giver. For example, in a case where the treatment is performed using the first treatment element which presses the treatment target site, if the second treatment element holds the treatment target site of the treatment receiver, the kneading action can be performed for a satisfactory treatment effect.

For example, in order to perform the treatment by pressing the shoulder of the treatment receiver from above, it is suitable to use the following method. The respective movements of the first treatment element and the second treatment element are in cooperation with each other. While the shoulder of the treatment receiver is held by the second treatment element, the shoulder is pressed from above by the first treatment element. Therefore, according to this characteristic configuration, while a front portion of the shoulder of the treatment receiver is held by the second treatment element, the first treatment element can properly perform the treatment on the shoulder of the treatment receiver from above.

In still another characteristic configuration of the treatment unit according to the present invention, a tip portion of the second treatment element may diverge into a plurality of limbs.

According to the above-described configuration, the first treatment element imitates the thumb, and the second treatment element imitates the remaining four fingers. Therefore, according to the above-described configuration, the treatment giver can perform the treatment analogously to the movement of the fingers when the treatment giver performs the treatment on the treatment receiver by kneading the treatment receiver with the thumb and the four fingers.

In still another characteristic configuration of the treatment unit according to the present invention, a tip portion of the treatment element may have an inflatable bag.

According to the above-described configuration, it is possible to perform the treatment corresponding to acupressure performed with own fingers of the treatment giver.

In still another characteristic configuration of the treatment unit according to the present invention, an eccentric amount of the eccentric cam may be larger than an eccentric amount of the swash plate eccentric cam.

According to the above-described configuration, the eccentric amount of the swash plate eccentric cam can correspond to an action imitating a movement of a wrist of the treatment giver, and the eccentric amount of the eccentric cam can correspond to an action imitating a movement of an elbow of the treatment giver. Therefore, according to the above-described configuration, the treatment giver can perform the treatment more analogously to the action performed when the treatment giver kneads the treatment receiver by using the movement of the fingers and the arms for the treatment receiver.

In order to achieve the above-described object, a characteristic configuration of a massage machine according to the present invention includes the above-described treatment unit. The treatment part is used in performing treatment on a shoulder of a treatment receiver.

According to the above-described configuration, while the treatment element presses the shoulder from above, a twisting effect is further applied to the pressing operation. In this manner, the treatment can be performed on the shoulder in order to obtain a satisfactory treatment effect.

In order to achieve the above-described object, a characteristic configuration of a massage machine according to the present invention includes the above-described treatment unit. The treatment part is used in performing treatment on a back of a treatment receiver.

According to the above-described configuration, while the treatment element presses the back from an upper rear surface, the twisting effect is applied to the pressing operation. In this manner, the treatment can be performed on the back in order to obtain the satisfactory treatment effect.

In still another characteristic configuration of the massage machine according to the present invention, the massage machine may further include a roller facing the back of the treatment receiver formed integrally with the treatment unit. The roller may move upward and downward along the back while the roller is rotated in accordance with an upward and downward movement of the treatment unit.

According to the above-described configuration, while the treatment unit is smoothly and moved upward and downward by using the rotation of the roller, the treatment can be performed on the back of the treatment receiver by using the upward and downward operation of the roller. Therefore, it is possible to realize a smooth upward and downward operation of the treatment unit and the treatment on the back without increasing the number of components.

Embodiments of the Invention

Hereinafter, embodiments according to the present invention will be described in detail with reference to the drawings. The embodiments described below are examples for describing the present invention, and the present invention is not limited only to these embodiments. Therefore, the present invention can be embodied in various forms as long as the forms do not depart from the gist of the present invention.

(1) First Embodiment

Overall Configuration of Massage Machine

FIG. 1 illustrates an overall structure of a massage machine 1 according to the present embodiment. The massage machine 1 is a so-called massage chair including a seat unit 11 and a backrest unit 12. The massage machine 1 further includes an upward and downward moving arm 15, a shoulder treatment mechanism 200 serving as an example of a treatment unit.

The seat unit 11 is for a treatment receiver to sit thereon in a state where buttocks or thighs of the treatment receiver are in contact with the seat unit 11. The backrest unit 12 supports a back of the treatment receiver sitting on the seat unit 11. Hereinafter, in the massage machine 1, a ventral side in a state where the treatment receiver sits on the seat unit 11 will be defined as "forward", a dorsal side will be defined as "rearward", a right hand side will be defined as "rightward", a left hand side will be defined as "leftward", a head side will be defined as "upward", and a foot side will be defined as "downward". In addition, a direction parallel to a shoulder width direction of the treatment receiver will be defined as a "width direction" or a "rightward-leftward direction", a direction parallel to a direction from the front to the rear will be defined as a "forward-rearward direction", and a direction perpendicular to both the width direction and the forward-rearward direction will be defined as an "upward-downward direction". In addition, in the following description, in a case where the directions such as "leftward" or "rightward in the "rightward-leftward direction", "forward" or "rearward" in the "forward-rearward direction", and "upward" or "downward" in the "upward-downward direction" are described without any special notes, the respective directions may be sometimes simply referred to as "leftward" or "rightward", "forward" or "rearward", and "upward" or "downward". For example, the right side and rightward in the rightward-leftward direction may be simply referred to as the "right side" or "rightward".

In the following description of the embodiment, the shoulder treatment mechanism 200 on the left side (for performing treatment on a left shoulder) in the massage machine 1 illustrated in FIG. 1 will be described. The massage machine 1 has symmetrical shapes on the right side and the left side. Accordingly, the shape of the shoulder treatment mechanism 200 on the right side will be omitted in the description.

Overall Configuration of Shoulder Treatment Mechanism

Figure 2:
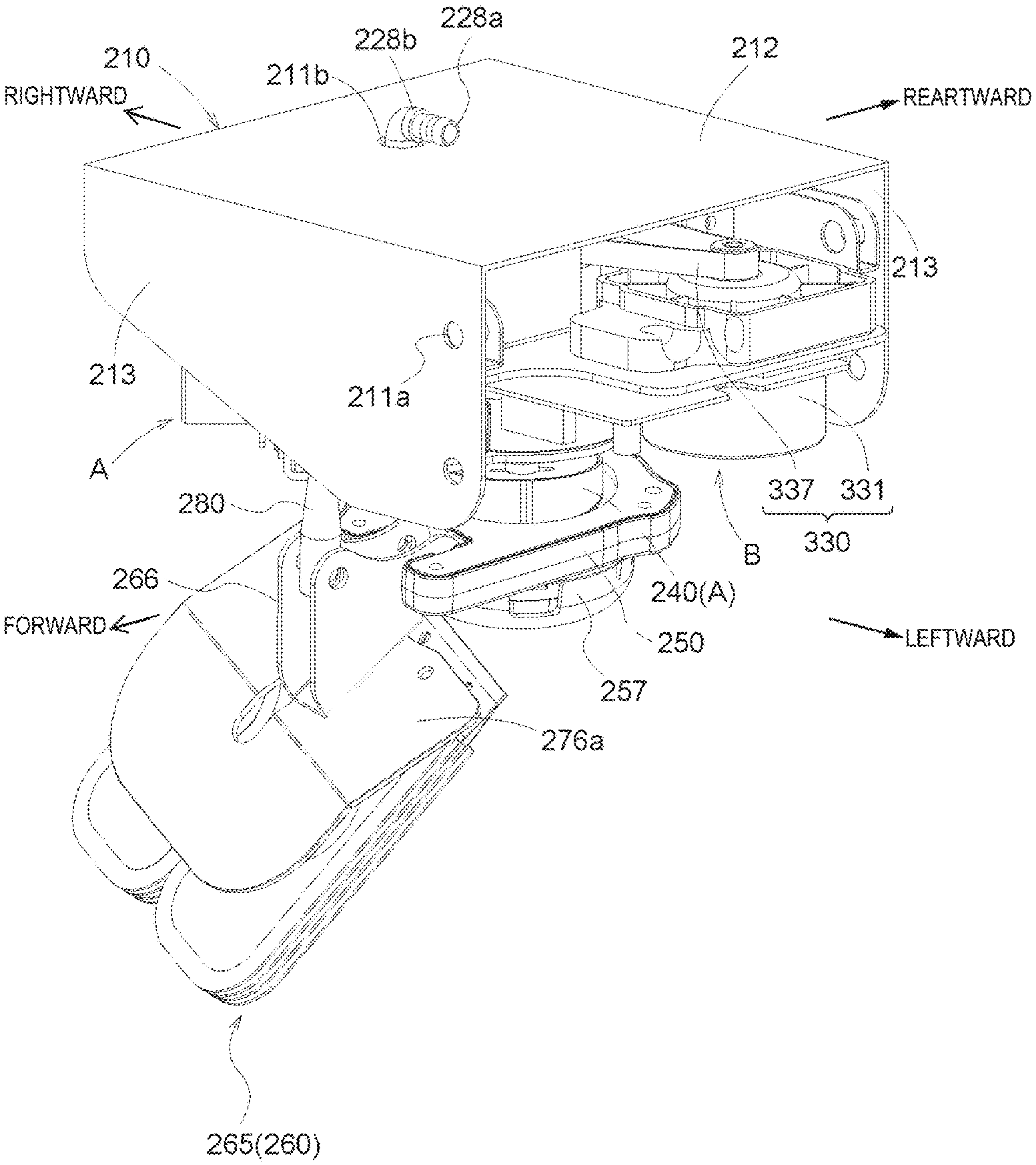
FIG. 2 is a perspective view illustrating an overall configuration of a shoulder treatment mechanism.
Figure 3:
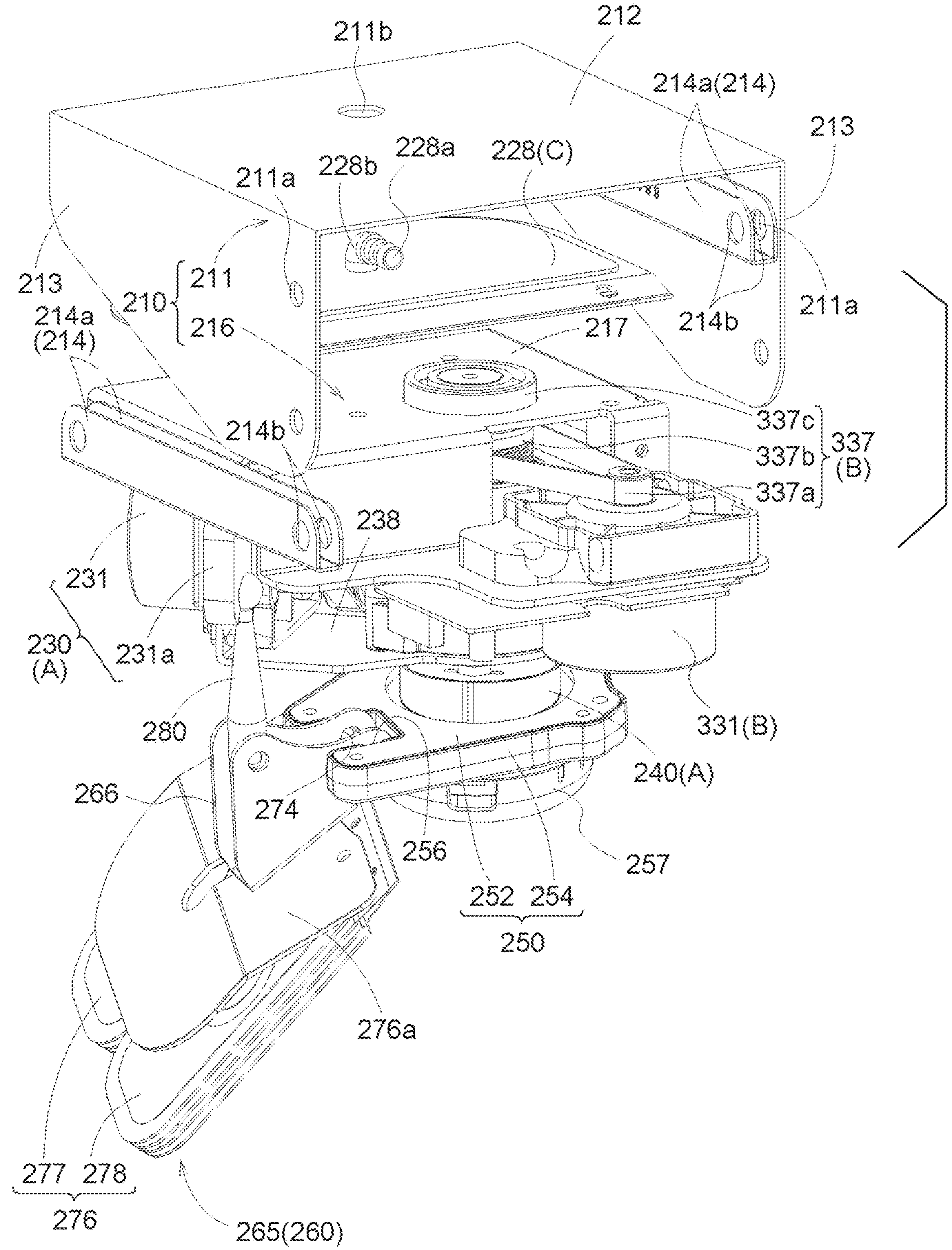
FIG. 3 is an exploded perspective view of the shoulder treatment mechanism when viewed from a left side surface.
Figure 4:
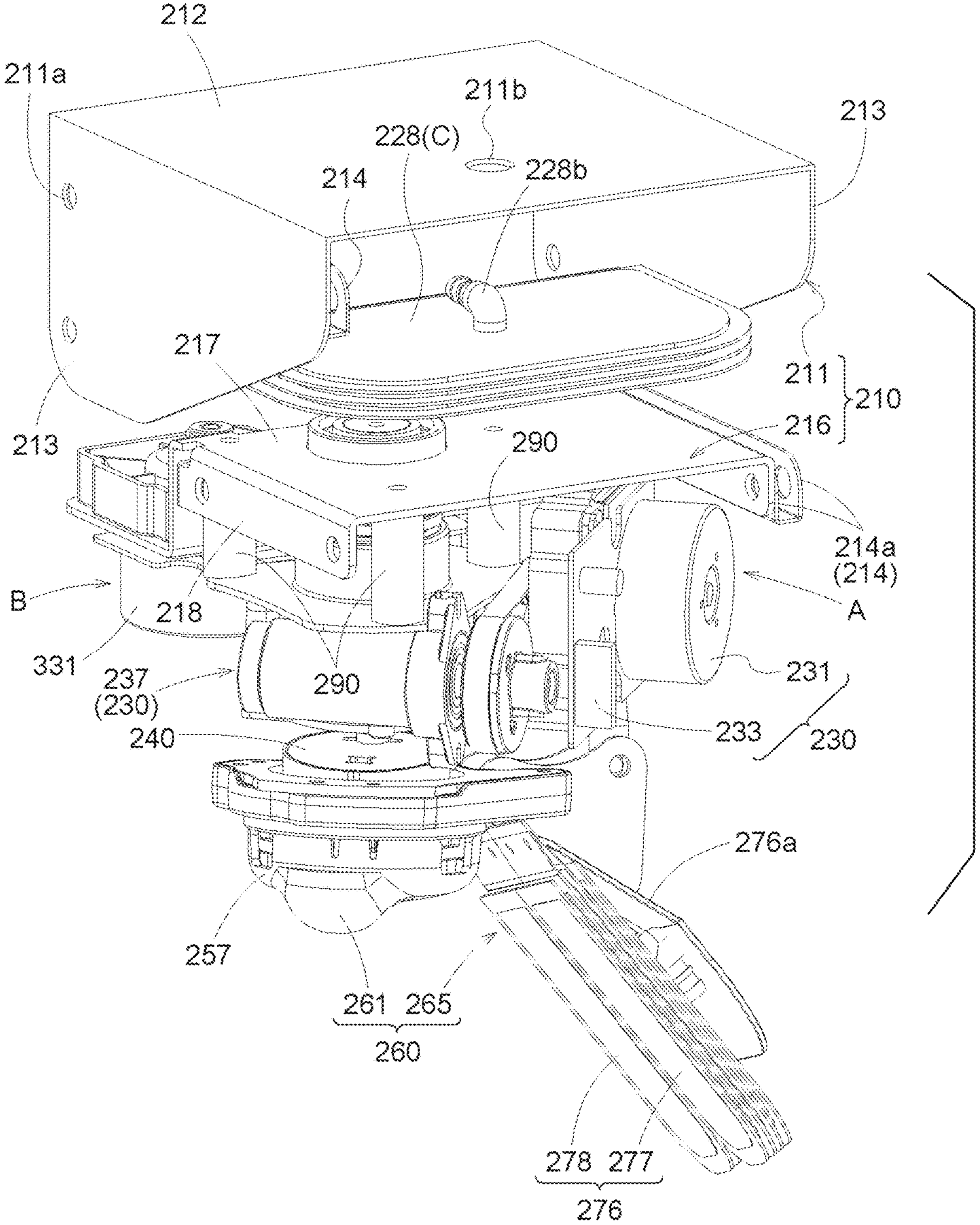
FIG. 4 is an exploded perspective view of the shoulder treatment mechanism when viewed from a right side surface.

The shoulder treatment mechanism 200 performs treatment on a treatment target site of a treatment receiver. According to the present embodiment, the treatment is performed on a shoulder of the treatment receiver. In particular, the treatment is performed by pressing the shoulder from above. As illustrated in FIGS. 2 to 4, the shoulder treatment mechanism 200 has a base 210, a first drive unit A, a second drive unit B, a third drive unit C, and a treatment element holder 250 (example of a treatment part) having a treatment element 260. As the treatment element 260, the treatment element holder 250 has a first treatment element 261 and a second treatment element 265 whose tip portion diverges into two limbs. The second treatment element 265 is located relatively on a front side of the first treatment element 261 in the forward-rearward direction.

The first drive unit A has a first treatment motor drive unit 230 and a first cam 240 (example of a swash plate eccentric cam). The second drive unit B has a second treatment motor drive unit 330 and a second cam 340 (example of an eccentric cam, refer to FIG. 8).

As will be described later, the treatment element holder 250 is connected to the first cam 240 of the first drive unit A. In addition, the first cam 240 (first drive unit A) is connected to the second cam 340 of the second drive unit B. That is, a configuration is adopted so that an operation of the second cam 340 is transmitted to the treatment element holder 250 via the first cam 240.

Furthermore, as will be described later, the second cam 340 of the second drive unit B is connected to the third drive unit C. That is, a configuration is adopted so that an operation of the third drive unit C is transmitted to the treatment element holder 250 via the first drive unit A and the second drive unit B.

Base

As illustrated in FIGS. 3 and 4, the base 210 includes a first base 211 and a second base 216. The base 210 is suspended from and fixed (not illustrated) to the upward and downward moving arm 15 extending forward of a back contact surface 13 from a side surface 14 on the left side of the backrest unit 12. The upward and downward moving arm 15 is configured to be movable along the side surface 14 and along an extending direction of the backrest unit 12 (refer to FIG. 1).

The first base 211 is formed by bending a metal plate into a U-shape, and has a bottom portion 212 and a pair of side portions 213. The bottom portion 212 of the first base 211 is attached to the upward and downward moving arm 15 (refer to FIG. 1) by using a screw. In the side portion 213, a circular joint holding through-hole 211*a* is formed at a location facing the side portion 213. The first base 211 extends in the rightward-leftward direction, and the joint holding through-hole 211*a* is formed in the leftward end portion of the side portion 213.

The second base 216 is formed by bending a metal plate in a U-shape, and has a pair of side portions 218. The second base 216 is located at a location interposed between the bottom portion 212 and the side portion 213 of the first base 211. The bottom portion 217 of the second base 216 faces the bottom portion 212 of the first base 211. The second base 216 is connected to the first base 211 in a pair of connectors 214 by using a screw.

The connector 214 is located between the outside of the respective side portions 218 of the second base 216 and the inside of the respective side portions 213 of the first base 211. The connector 214 is formed by bending a metal plate in a U-shape, and has a bottom portion and a pair of side portions 214*a*. In the side portion 214*a*, a pair of circular through-holes 214*b* is formed at positions facing the side portion 214*a*. The connector 214 is disposed so as to extend in the rightward-leftward direction, and the through-hole 214*b* is formed in a leftward end portion of the connector 214.

A right side of the connector 214 is fixed to the second base 216 by using a screw. The connectors 214 are connected to each other by a joint pin (not illustrated) penetrating the through-hole 214*b* and the joint holding through-hole 211*a*. The connector 214 is attached to the first base 211 so as to be capable of oscillating by using the joint pin penetrating the joint holding through-hole 211*a* as a pivot axis. In this manner, the second base 216 fixed to the connector 214 is attached to the first base 211 via the connector 214 so as to be capable of oscillating by using the joint pin penetrating the joint holding through-hole 211*a* as a pivot axis. That is, a right side of the second base 216 can move away from or can move close to the first base 211.

First Drive Unit (a) First Treatment Motor Drive Unit

As illustrated in FIGS. 2 to 4 and 6, the first treatment motor drive unit 230 is accommodated in an inner space of the first base 211. The first treatment motor drive unit 230 has a brushless DC motor (hereinafter, referred to as a "first treatment motor") 231, a first treatment motor drive circuit 233 for driving the first treatment motor 231, and a first reduction gear 237 for reducing rotation speed of the first treatment motor 231 so as to transmit the reduced rotation speed to a treatment output shaft 235.

The first treatment motor 231 and the first treatment motor drive circuit 233 are fixed to the first reduction gear 237 via a stay 238. The first reduction gear 237 is fixed to a lower side surface of a flat plate portion 234*a* of a substructure 234 by using a screw. The first treatment motor drive unit 230 is integrated with the substructure 234. In addition, the first cam 240 (to be described later) is attached to the treatment output shaft 235.

The first treatment motor 231 is located so that a rotary shaft thereof is perpendicular to an axis X (refer to FIG. 6) serving as a rotation center of the treatment output shaft 235. The rotation speed of the first treatment motor 231 is reduced via a pulley 237*a* of the first reduction gear 237, a worm rotary shaft 237*b*, and a gear 237*d* inside a gear box 237*c*. In addition, a rotation transmission direction thereof is converted into a right angle so that the rotation speed is transmitted to the treatment output shaft 235. The axis X is located so as to intersect (perpendicular to) the bottom portion 212 of the first base 211 and the bottom portion 217 of the second base 216.

The flat plate portion 234*a* of the substructure 234 is connected to a plurality of (three) cylindrical rubber dampers 290 to be connected to a lower surface of the bottom portion 217 of the second base 216 by using a screw, and is suspended so as to be parallel to the bottom portion 217. The rubber damper 290 is connected to the bottom portion 217 and the flat plate portion 234*a* so that a longitudinal direction thereof is perpendicular. The flat plate portion 234*a* is connected to the rubber damper 290 by using a screw. That is, the flat plate portion 234*a* intersects the axis X perpendicularly. In this manner, the substructure 234 can oscillate in a direction intersecting (perpendicular to) the axis X with respect to the second base 216.

(b) First Cam

Figure 5:
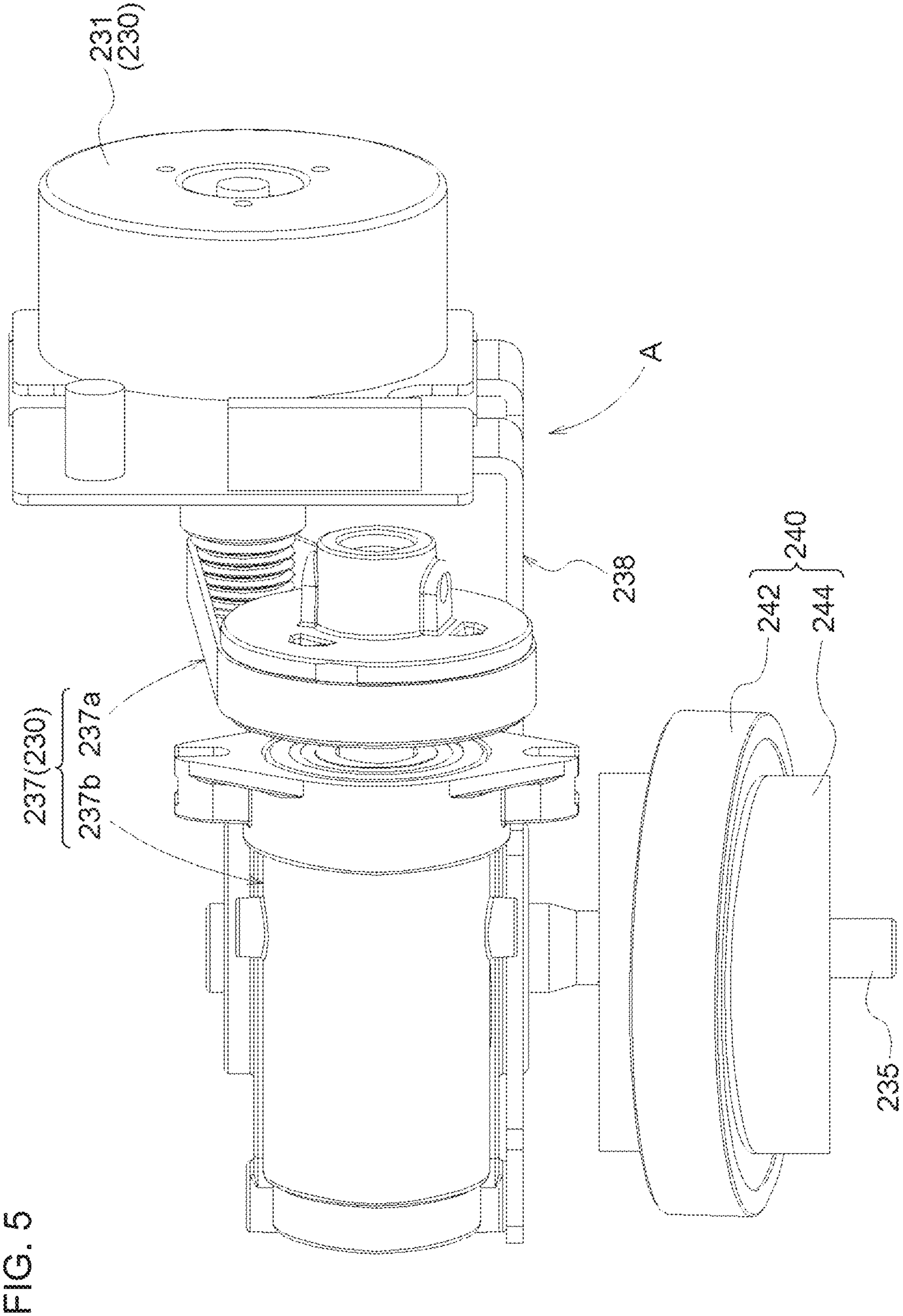
FIG. 5 is a side view of a first cam.
Figure 6:
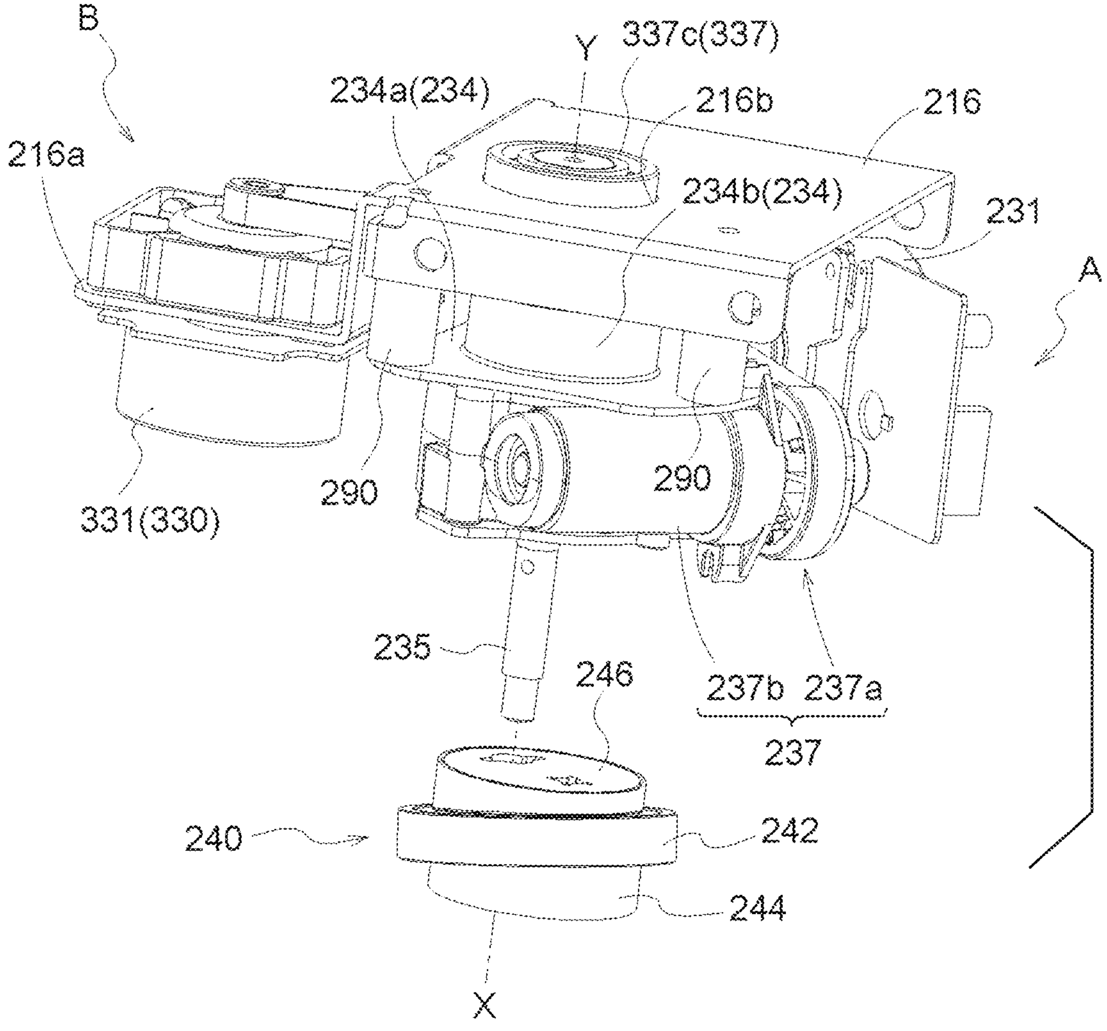
FIG. 6 is an exploded perspective view of a first drive unit.
Figure 7:
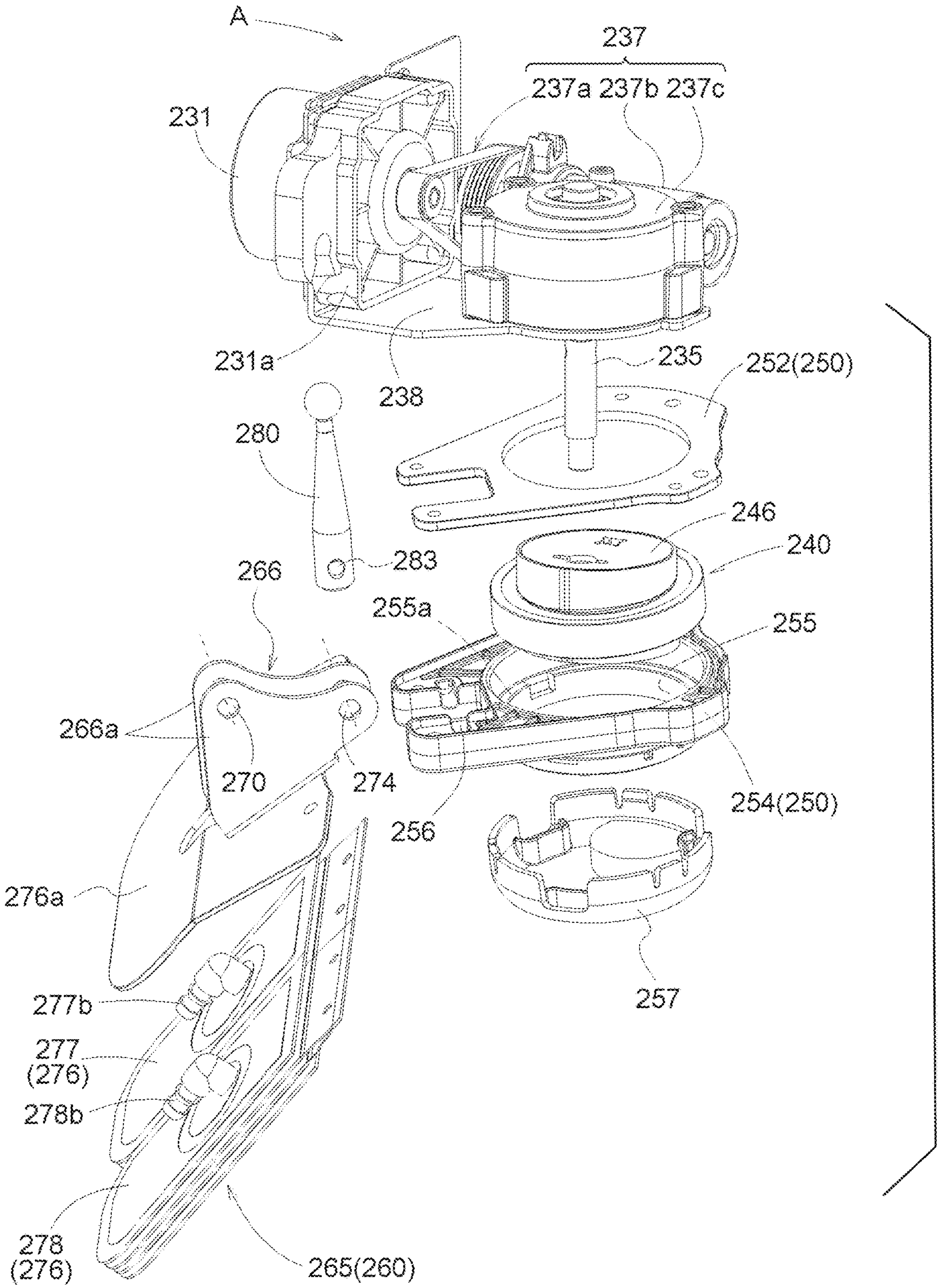
FIG. 7 is an exploded perspective view of the first cam and a treatment element holder.

As illustrated in FIGS. 5 to 7, the first cam 240 includes a ball bearing 242 which is an example of an annular bearing, a circular resin-made cam main body 244 which pinches an inner ring of the ball bearing 242 from both sides in the axial direction and which is rotated integrally with the inner ring of the ball bearing 242, and fixing plates 246 which are attached to two bottom surfaces of the cam main body 244 and which pinch the cam main body 244 from further outside.

The first cam 240 has two holes penetrating the cam main body 244 and the fixing plates 246. A bolt (not illustrated) is inserted into one hole from one of the fixing plates 246 to the cam main body 244 and the other fixing plate 246, and is fastened with a nut (not illustrated). In this manner, the fixing plates 246, the cam main body 244, and the ball bearing 242 are integrated with each other. The treatment output shaft 235 is inserted into the other hole, and is fastened with a nut (not illustrated). A detent pin (not illustrated) protruding in a radial direction is inserted into the treatment output shaft 235, and a shape fitting to the detent pin is formed in one of the fixing plates 246. In this manner, the treatment output shaft 235 and the first cam 240 (except an outer ring of the ball bearing 242) are rotated integrally with each other.

The axis X of the treatment output shaft 235 serves as the rotation axis of the first cam 240. However, the treatment output shaft 235 is attached eccentrically from the rotation center of the ball bearing 242, that is, the axis of the cam main body 244. In this manner, when the treatment output shaft 235 is rotated, the inner ring of the ball bearing 242 of the first cam 240 is rotated in a state of being eccentric with respect to the axis X (refer to FIG. 6).

In addition, the rotation axis of the ball bearing 242 is inclined with respect to both the axis and the bottom surface of the cam main body 244. Specifically, a point is assumed on a circumference where a radial half line passing through the center of the treatment output shaft 235 from the axis of the cam main body 244 as a start point intersects an outer peripheral surface of the cam main body 244. The ball bearing 242 is inclined so that a location farthest away from the first treatment motor drive unit 230 of the ball bearing 242 is located on a line which passes through the point and which is parallel to the axis of the cam main body 244. In other words, a location closest to the treatment output shaft 235 inside the ball bearing 242 is farthest away from the first treatment motor drive unit 230, and a location farthest away from the treatment output shaft 235 is closest to the first treatment motor drive unit 230. In this manner, when the treatment output shaft 235 is rotated, the inner ring of the ball bearing 242 of the first cam 240 is rotated in a state of being deflected with respect to the axis X.

That is, when the treatment output shaft 235 is rotated, the inner ring of the ball bearing 242 of the first cam 240 is rotated in a state of being eccentric and deflected with respect to the axis X.

Second Drive Unit (a) Second Treatment Motor Drive Unit

As illustrated in FIGS. 3, 4, and 6, the second treatment motor drive unit 330 is accommodated in an inner space of the first base 211. The second treatment motor drive unit 330 has a brushless DC motor (hereinafter, referred to as a "second treatment motor") 331, a second treatment motor drive circuit (not illustrated) for driving the second treatment motor 331, and a second reduction gear 337 which reduces the rotation speed of the second treatment motor 331 so as to transmit the rotation speed to the second cam 340. The second treatment motor 331 is driven independently of the first treatment motor 231.

The second treatment motor 331 is located so that a rotary shaft is oriented in a direction along the axis X (refer to FIG. 6) serving as the rotation center of the treatment output shaft 235. The second treatment motor 331 and the second treatment motor drive circuit are fixed to an extending portion **216*a* of the second base 216 (refer to FIG. 6). The second reduction gear 337 has a pulley 337*b*, a bearing portion 337*c* of the pulley 337*b*, and a pulley belt 337*a* which transmits the rotation from the rotary shaft of the second treatment motor 331 to the pulley 337*b* (refer to FIG. 3). The second reduction gear 337 is fixed by fitting a casing of the bearing portion 337*c* into an opening portion 216*b* disposed in the second base 216 (refer to FIG. 6). In this way, the second treatment motor drive unit 330 is integrated with the second base 216. The second cam 340 (to be described later) is attached to the pulley 337*b*. The axis Y serving as the rotation center of the pulley 337*b* is located parallel to the axis X (refer to FIG. 8**).

(b) Second Cam

Figure 8:
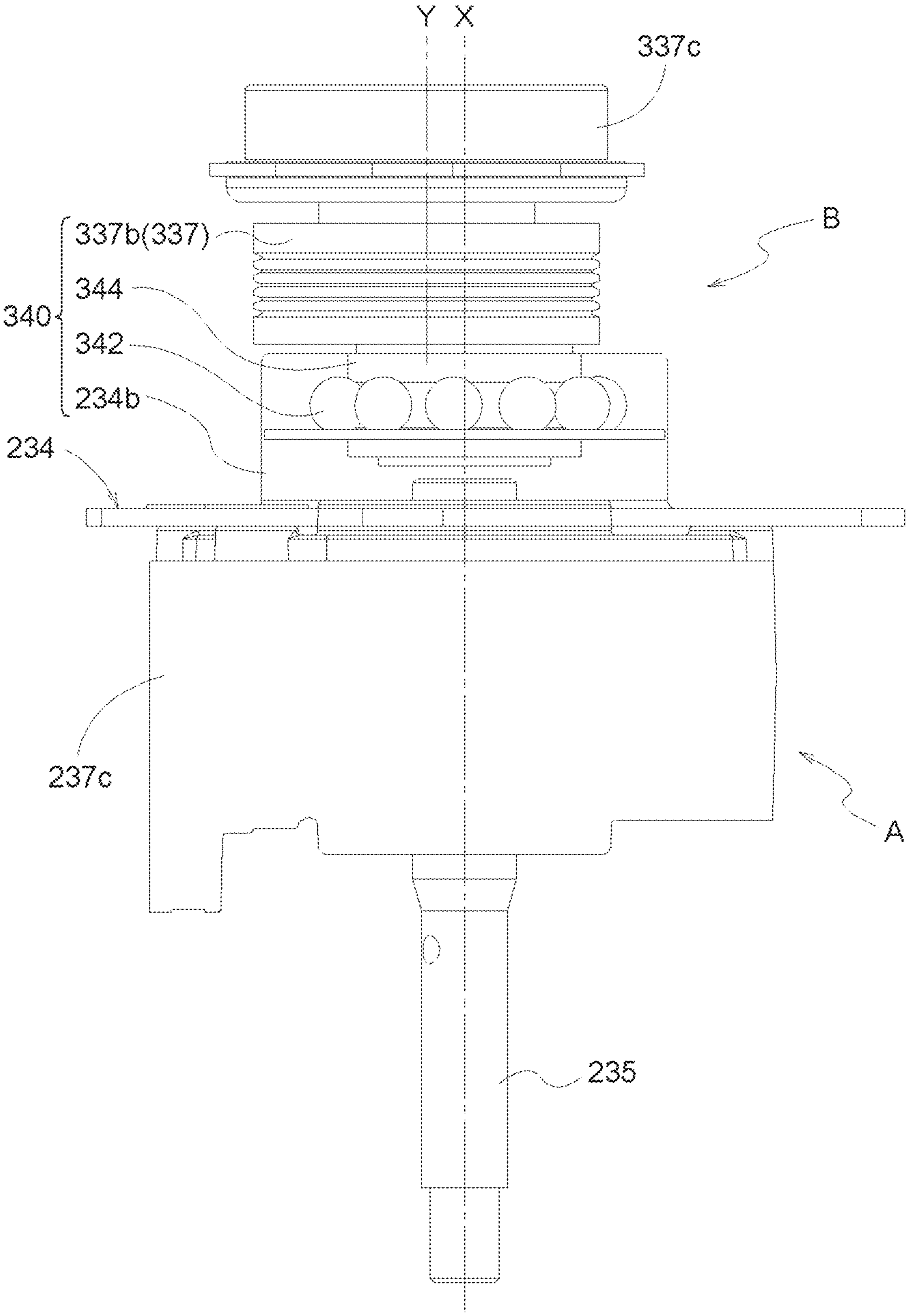
FIG. 8 is a side view (perspective view) of a second cam.
Figure 9:
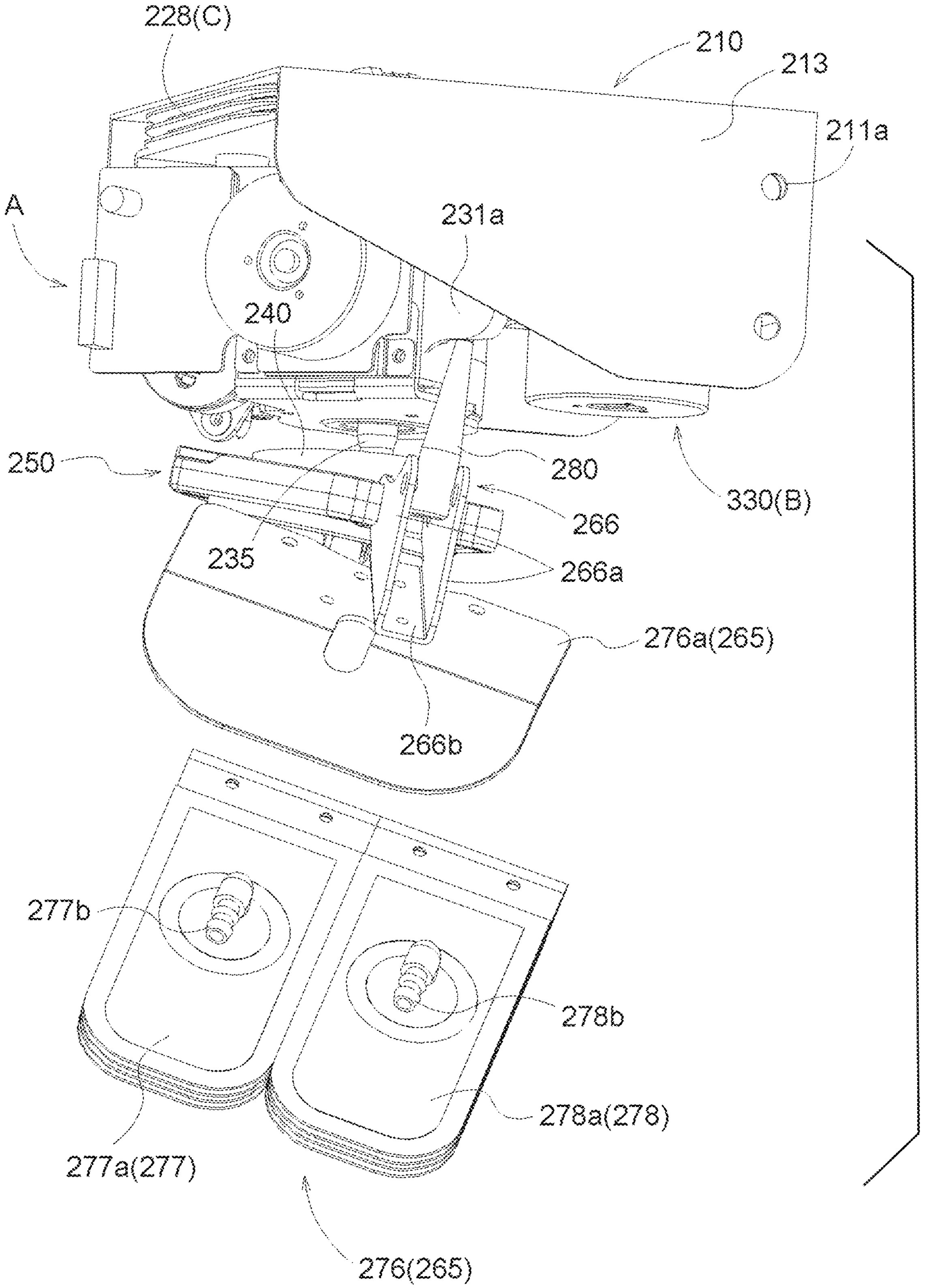
FIG. 9 is an exploded perspective view of a second treatment element.
Figure 10:
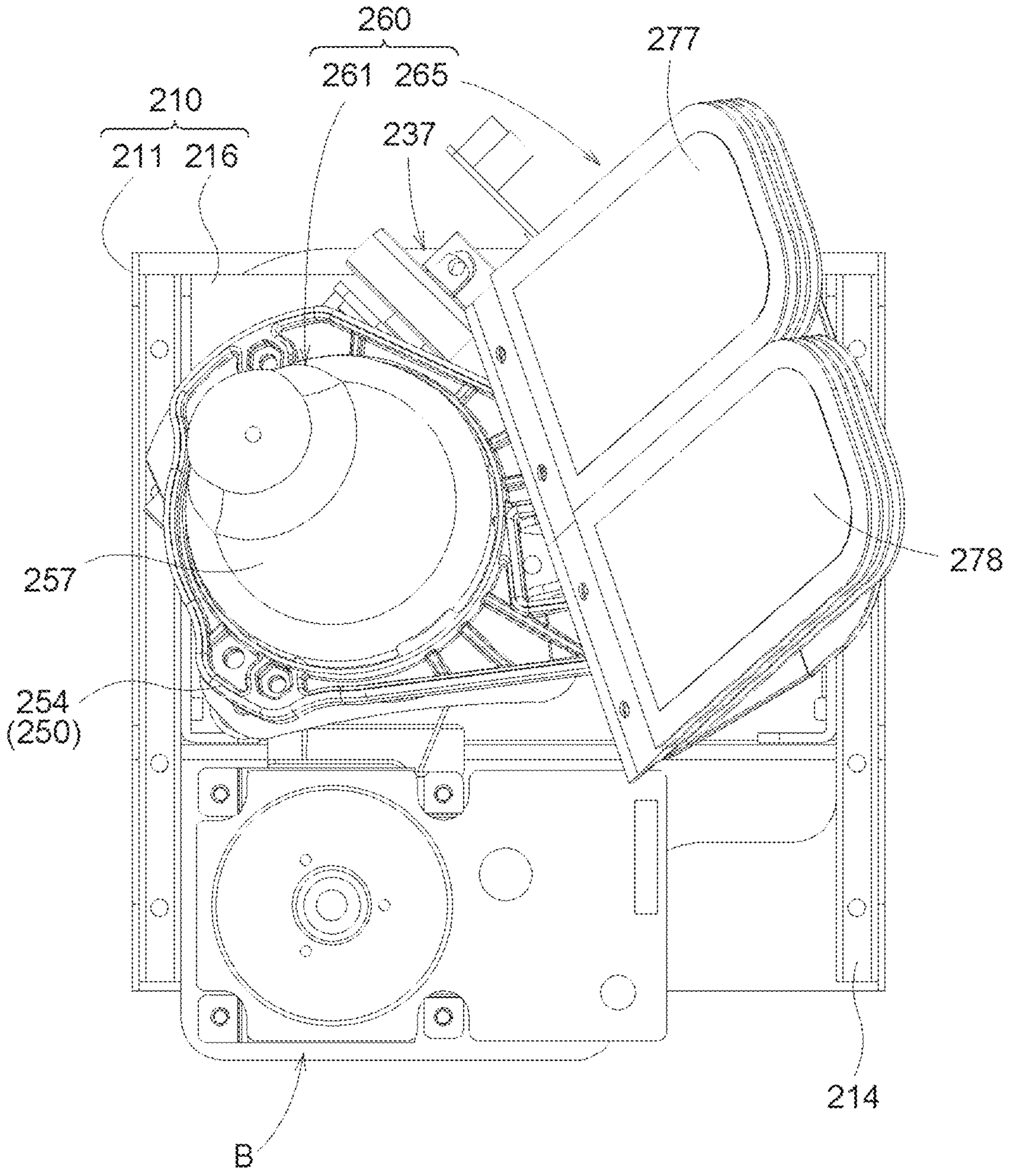
FIG. 10 is a view when a treatment element is viewed from below.

As illustrated in FIG. 8, the second cam 340 includes a ball bearing 342 which is an example of an annular bearing, a cam main body 344 which is rotated integrally with the inner ring of the ball bearing 342, and a sleeve **234*b* of the substructure 234 which is fitted to the outer periphery of the ball bearing 342. The sleeve 234*b* is disposed as a tubular portion extending upward from the flat plate portion 234*a* of the substructure 234. The ball bearing 342 is fitted into a tube of the tubular portion, thereby relatively fixing the ball bearing 342 and the substructure 234** to each other.

The cam main body 344 is disposed integrally with the pulley **337*b*. The cam main body 344 is attached eccentrically from the rotation center of the pulley 337*b*, that is, the axis Y. In this manner, when the pulley 337*b* is rotated, the inner ring of the ball bearing 342 of the second cam 340** is rotated in a state of being eccentric with respect to the axis Y.

According to the above-described configuration, an operation of the second cam 340 of the second drive unit B can be transmitted to the connecting first cam 240 the first drive unit A, that is, the substructure 234 and the first cam 240 connected thereto via the treatment output shaft 235 of the first treatment motor drive unit 230.

Third Drive Unit

As illustrated in FIGS. 3 and 4, an inflatable bag 228 which is an example of the third drive unit C is attached between the bottom portion 212 of the first base 211 and the bottom portion 217 of the second base 216. In this manner, a force (biasing force) in a direction away from the first base 211 along the axis X can be appropriately applied to the right side of the second base 216 in the rightward-leftward direction.

The inflatable bag 228 is an air bag which is inflated and deflated in volume by injecting and discharging air, and is an actuator which generates a pressing force by being inflated.

The inflatable bag 228 has a bellows in a direction along the surface of the bottom portion 212 and the bottom portion 217. If the air is supplied from an air compressor (not illustrated) via an air hole **228*a*, the bellows expands, and the inflatable bag 228 is inflated in volume in response to an increase in the air supply amount, thereby generating the force (biasing force) in the direction in which the bottom portion 212 and the bottom portion 217** are separated from each other. That is, the biasing force can be adjusted by the inflating amount corresponding to the air supply amount. For example, for a person who wants the shoulder to be strongly pressed, the inflating amount is increased, and for a person who wants the shoulder to be weakly pressed, the inflating amount is decreased.

The inflatable bag 228 extends in the rightward-leftward direction, and a left end portion is fixed to the first base 211 by using a screw. The inflatable bag 228 fixes a plug **228*b* to the bottom portion 212 by using a screw in a state where the plug 228*b* having an air hole 228*a* disposed in a central portion of the inflatable bag 228 in the rightward-leftward direction is inserted from below into the through-hole 211*b* disposed in a central portion of the bottom portion 212 of the first base 211**.

Treatment Part (a) Treatment Element Holder

As illustrated in FIGS. 3, 4, and 7, the treatment element holder 250 is attached to the first cam 240. The treatment element holder 250 is configured so that to a plate-shaped and metal-made first member 252 and a resin-made second member 254 having a bottom surface and side surfaces erected so as to surround the periphery of the bottom surface are fastened to each other by using a screw. The first member 252 functions as a lid for covering the periphery of the cam holding through-hole 255 of the second member 254. In the treatment element holder 250, a cam holding through-hole 255 having a circular cross section and fitted to the outer ring of the ball bearing 242 of the first cam 240 is formed from the first member 252 to the second member 254. The cam holding through-hole 255 is formed by a cylindrical projection 255*a* perpendicularly erected from the bottom surface in the second member 254. The outer ring of the ball bearing 242 is attached to the inner peripheral surface of the projection 255*a* by using a method such as press fitting or bonding. That is, the treatment element holder 250 is attached so as to be perpendicular to the rotation axis of the ball bearing 242. Accordingly, the treatment element holder 250 is inclined at the same angle as that of the ball bearing 242 with respect to the treatment output shaft 235. A cover 257 is attached to the first cam 240 so as to cover an end portion on a side opposite to a side where a projection is formed on the bottom surface of the second member 254 (refer to FIG. 7).

(b) Treatment Element

As illustrated in FIGS. 3, 4, 7, 9, and 10, the first treatment element 261 (an example of the treatment element) made of a resin or rubber is integrally formed inside the first cam 240 in the width direction (that is, on the left side of the first cam 240 when viewed from the front to the rear) in the cover 257 of the second member 254 of the treatment element holder 250. The first treatment element 261 protrudes downward, and a tip thereof has a substantially hemispherical shape. The first treatment element 261 imitates the treatment performed by the thumb of the treatment giver. For example, the first treatment element 261 presses acupressure points such as SI15, SI14, SI13, and GB21, or muscles such as a latissimus dorsi muscle, a levator scapulae muscle, and a trapezius muscle.

The second treatment element 265 is attached to the treatment element holder 250 so as to be capable of oscillating in the forward-rearward direction and the upward-downward direction in the vicinity and in front of a location to which the first cam 240 of the treatment element holder 250 is attached. The second treatment element 265 has a connection member 266, a second treatment element main body 276, and a connection shaft (example of a link) 280.

The connection member 266 is a member in which two plate-shaped members 266*a* having a substantially right-angled triangle shape with a rounded corner are arranged parallel to each other and an oblique side of the right-angled triangle shape is connected to a plate-shaped member 266*b*, and is formed of a resin. The corner portion of the respective plate-shaped members 266*a* having a long side out of two sides (long side and short sides) across a right angle and an oblique side has a pair of through-holes 274 so as to penetrate the respective plate-shaped member 266*a* with the same axis. A shaft pin (not illustrated) is inserted into the pair of through-holes 274. The shaft pin is inserted into a U-shaped groove 256 formed in the second member 254 of the treatment element holder 250, and the first member 252 covers the U-shaped groove 256. In this manner, the connection member 266 is held so as to be capable of oscillating in the forward-rearward direction and the upward-downward direction by using the through-hole 274 as the axis with respect to the treatment element holder 250. The connection member 266 is attached to the treatment element holder 250 so that the through-hole 274 is parallel to the width direction of the treatment element holder 250. The right angle corner portion of the respective plate-shaped members 266*a* of the connection member 266 has a through-hole 270 so as to penetrate the respective plate-shaped members 266*a*.

The second treatment element main body 276 is made of a resin or rubber. A base end side thereof is fixed via a screw to a support plate 276*a* to be fixed to the plate-shaped member 266*b* of the connection member 266 by using a screw, and is integrated with connection member 266. The second treatment element main body 276 is located outward in the width direction from the first treatment element 261, and extends forward from the treatment element holder 250. That is, when viewed along the width direction, the second treatment element main body 276 is located in front of the first treatment element 261, and a tip portion of the second treatment element main body 276 is located below a tip portion of the first treatment element 261.

The tip side of the second treatment element main body 276 is a location which comes into contact with the shoulder of the treatment receiver, and diverges into two limbs toward the tip from an intermediate portion of the second treatment element main body 276. Sizes of the respective limbs in the width direction are the same as each other. A first contact portion 277 which is the limb located inward in the width direction and a second contact portion 278 which is the limb located outward in the width direction have the same size.

In addition, the total width of the tip portion of the second treatment element main body 276 is wider than the width (diameter of the hemispherical portion) of the first treatment element 261. A base end side of the first contact portion 277 and the second contact portion 278 is fixed via a screw to the support plate 276*a* to be fixed to the plate-shaped member 266*b* of the connection member 266 by using a screw.

The first contact portion 277 and the second contact portion 278 respectively have an inflatable bag 277*a* and an inflatable bag 278*a* which have a bellows along an extending direction thereof. If the air is supplied from an air compressor (not illustrated) via air holes 277*b* and 278*b*, the bellows expands, and the inflatable bags are inflated in volume in response to an increase in the air supply amount (inflated in response to an increase in the air supply amount), thereby generating the force (biasing force) in the direction perpendicular to the extending direction of the first contact portion 277 or the second contact portion 278. The biasing force can be adjusted by the inflating amount corresponding to the air supply amount. In this manner, it is possible to weaken the pressure when the first contact portion 277 and the second contact portion 278 press the shoulder of the treatment receiver. For example, for a person who wants the shoulder to be strongly pressed, the inflating amount is increased, and for a person who wants the shoulder to be weakly pressed, the inflating amount is decreased.

The second treatment element main body 276 imitates the treatment performed by the four fingers excluding the thumb of the treatment giver. The second treatment element main body 276 supports or rubs the body of the treatment receiver from the front side, and presses the acupressure points such as ST12 or a greater pectoral muscle, for example. The second treatment element main body 276 may not diverge into the two limbs, and may be an integral type. In addition, the second treatment element main body 276 may diverge into three or more limbs. For example, the second treatment element main body 276 may diverge into four limbs imitating the four fingers excluding the thumb.

The connection shaft 280 extends in the upward-downward direction, and is located above the connection member 266 and the second treatment element main body 276. One end located above the connection shaft 280 is formed in a spherical shape, and is connected to a spherical hole disposed in a bearing holding cover 231*a* of the first treatment motor 231 by using a ball joint method. The other end located below the connection shaft 280 is attached to the connection member 266 so as to be capable of oscillating. That is, one end of the connection shaft 280 is connected to the bearing holding cover 231*a* so as to be capable of rotating and oscillating within a predetermined angle range when moving in the forward-rearward direction, the upward-downward direction, and the width direction.

The other end of the connection shaft 280 has a through-hole 283 formed in the radial direction, and is attached to the connection member 266 so as to be capable of oscillating by a connection pin (not illustrated) penetrating the through-hole 283 and the through-hole 270 of the connection member 266. The connection pin is attached parallel to the width direction of the treatment element holder 250, that is, parallel to the two through-holes 274. Accordingly, in the second treatment element 265 (connection member 266), the connection shaft 280 supports the connection pin so as to be capable of oscillating around the axis in the forward-rearward direction and the upward-downward direction. In addition, a connection location between the connection shaft 280 and the connection member 266 is located between the base end side and the tip side of the second treatment element 265.

According to the above-described configuration, the second treatment element 265 includes a so-called double link mechanism as follows. The connection member 266 configures a link capable of oscillating with respect to the treatment element holder 250. The connection shaft 280 configures a ball joint and a link capable of oscillating. Accordingly, the second treatment element 265 is movable in the upward-downward direction with respect to the treatment element holder 250, and is rotatable with respect to the bearing holding cover 231*a*, that is, the substructure 234 of the first drive unit A.

Operation of Treatment Element

Next, each operation of the first treatment element 261 and the second treatment element 265 when the massage machine 1 according to the present embodiment is operated will be described with reference to FIGS. 11 to 13.

First, in the following, description will be made on the operation in a state where the treatment receiver does not sit on the seat unit 11 of the massage machine 1, that is, in a state where the first treatment element 261 and the second treatment element 265 are not in contact with anything. As illustrated in FIGS. 11 to 13, a biasing force of the inflatable bag 228 is not applied to the second base 216. First, in the following, description will be made on the assumption that the second treatment motor 331 is not operated.

If the first treatment motor 231 is driven, the speed is reduced by the first reduction gear 237, and the treatment output shaft 235 is rotated. Since the treatment output shaft 235 is rotated, the cam main body 244 of the first cam 240, the fixing plate 246, and the inner ring of the ball bearing 242 are integrally rotated. However, the treatment element holder 250 is not rotated together. The reason is that the second treatment element 265 attached to the treatment element holder 250 is supported by the substructure 234 via the connection shaft 280 and the bearing holding cover 231*a*. However, the treatment element holder 250 is fixed to the outer ring of the ball bearing 242. Accordingly, even if the treatment element holder 250 is not rotated, no resistance is generated when the treatment output shaft 235, the cam main body 244, the fixing plate 246, and the inner ring of the ball bearing 242 are rotated.

As described above, the treatment output shaft 235 is attached in a state of being eccentric with respect to the axis of the cam main body 244 of the first cam 240. Accordingly, in response to the rotation of the treatment output shaft 235, the axis of the cam main body 244 of the first cam 240 revolves around the axis X. That is, the first cam 240 is rotated eccentrically with respect to the axis X of the treatment output shaft 235.

The rotation axis of the ball bearing 242 is inclined with respect to both the axis and the bottom surface of the cam main body 244. Accordingly, the treatment element holder 250 attached perpendicularly to the rotation axis of the ball bearing 242 is also inclined with respect to both the axis and the bottom surface of the cam main body 244. If the treatment output shaft 235 is rotated in this state, as illustrated in FIGS. 11 to 13, the treatment element holder 250 moves as much as the movement amount of the first cam 240 in the forward-rearward direction and the width direction with respect to the treatment output shaft 235 (refer to FIG. 11). At the same time, the treatment element holder 250 oscillates in the same angular range as the oscillating range (swinging in the upward-downward direction) of the ball bearing 242 (refer to FIGS. 12 and 13). That is, the position and inclination direction of the treatment element holder 250 in the forward-rearward direction and the width direction are continuously changed in accordance with the rotation angle of the treatment output shaft 235.

As described above, the first treatment element 261 is integrally attached to the cover 257 of the second member 254 of the treatment element holder 250. When a state where the treatment element holder 250 is located on the rightmost side with respect to the treatment output shaft 235 is set as a rotation reference (0 degrees) ((I) in each of FIGS. 11 to 13), the first treatment element 261 moves as follows. When viewed along the upward-downward direction, as illustrated in FIG. 11, as the treatment output shaft 235 is rotated in a clockwise direction as viewed from below, in conjunction with the movement of the treatment element holder 250, the first treatment element 261 passes through the front side (rotation angle of the treatment output shaft 235 is 90 degrees, FIG. 11(II)), the left side (180 degrees, FIG. 11(III)), and the rear side (270 degrees, FIG. 11(IV)), and moves (circular movement) again to the right side (0 degrees, FIG. 11(I)).

Figure 12:
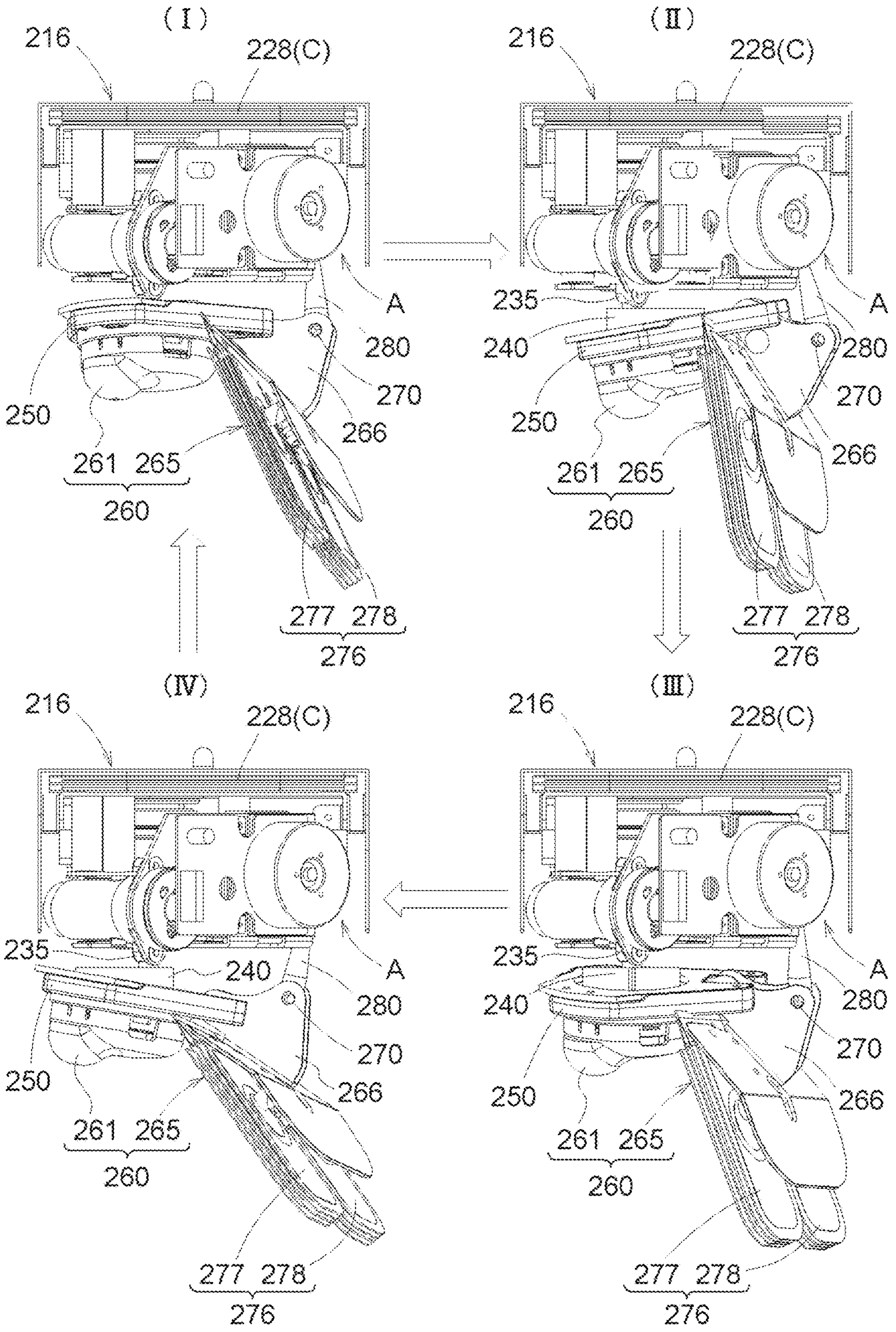
FIG. 12 is a view illustrating an operation of the first and second treatment elements.

At the same time, when viewed along the width direction, as illustrated in FIG. 12, the first treatment element 261 passes through an intermediate position (0 degrees, from (I) in FIG. 12, a lower position (90 degrees, (II) in FIG. 12), a lower position (180 degrees, (III) in FIG. 12), and an upper position (270 degrees, (IV) in FIG. 12)), and moves (oscillates) so as to reach the intermediate position (0 degrees) again. The reason is that the ball bearing 242 fitted into the treatment element holder 250 (first treatment element 261) is rotated in a state of being eccentric and deflected with respect to the treatment output shaft 235.

A left position means a position on the leftmost side and in the vicinity where the first treatment element 261 can be located in the width direction, and a right position means a position on the rightmost side and in the vicinity where the first treatment element 261 can be located in the width direction. The intermediate position means a position in the middle between the left position and the right position. The upper position means a position on the uppermost side and in the vicinity where the first treatment element 261 can be located in the upward-downward direction, and the lower position means a position on the lowermost side and in the vicinity where the first treatment element 261 can be located in the upward-downward direction. The intermediate position where the first treatment position means a position in the middle between the upper position and the lower position.

Figure 11:
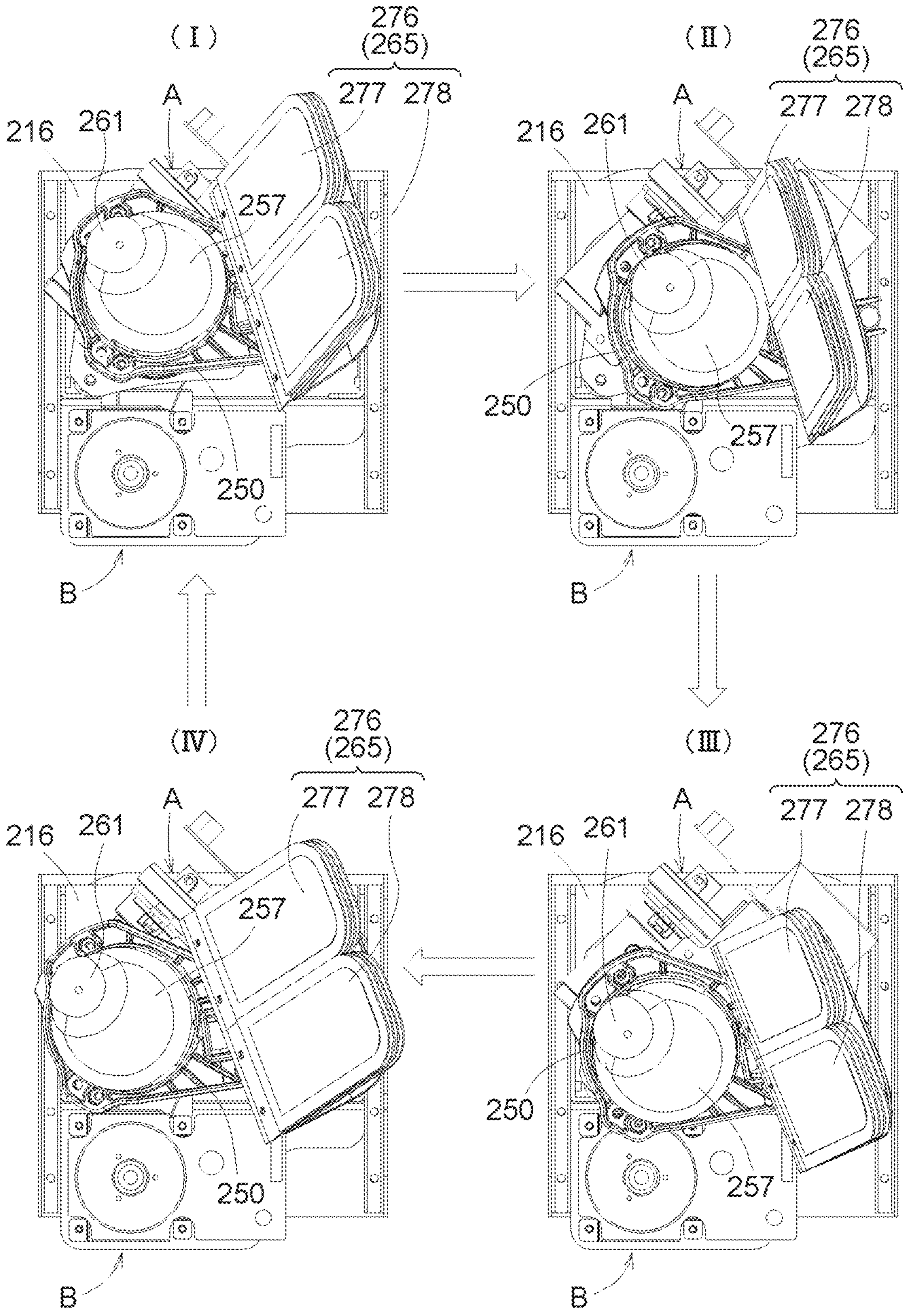
FIG. 11 is a view illustrating an operation of the first and second treatment elements.
Figure 13:
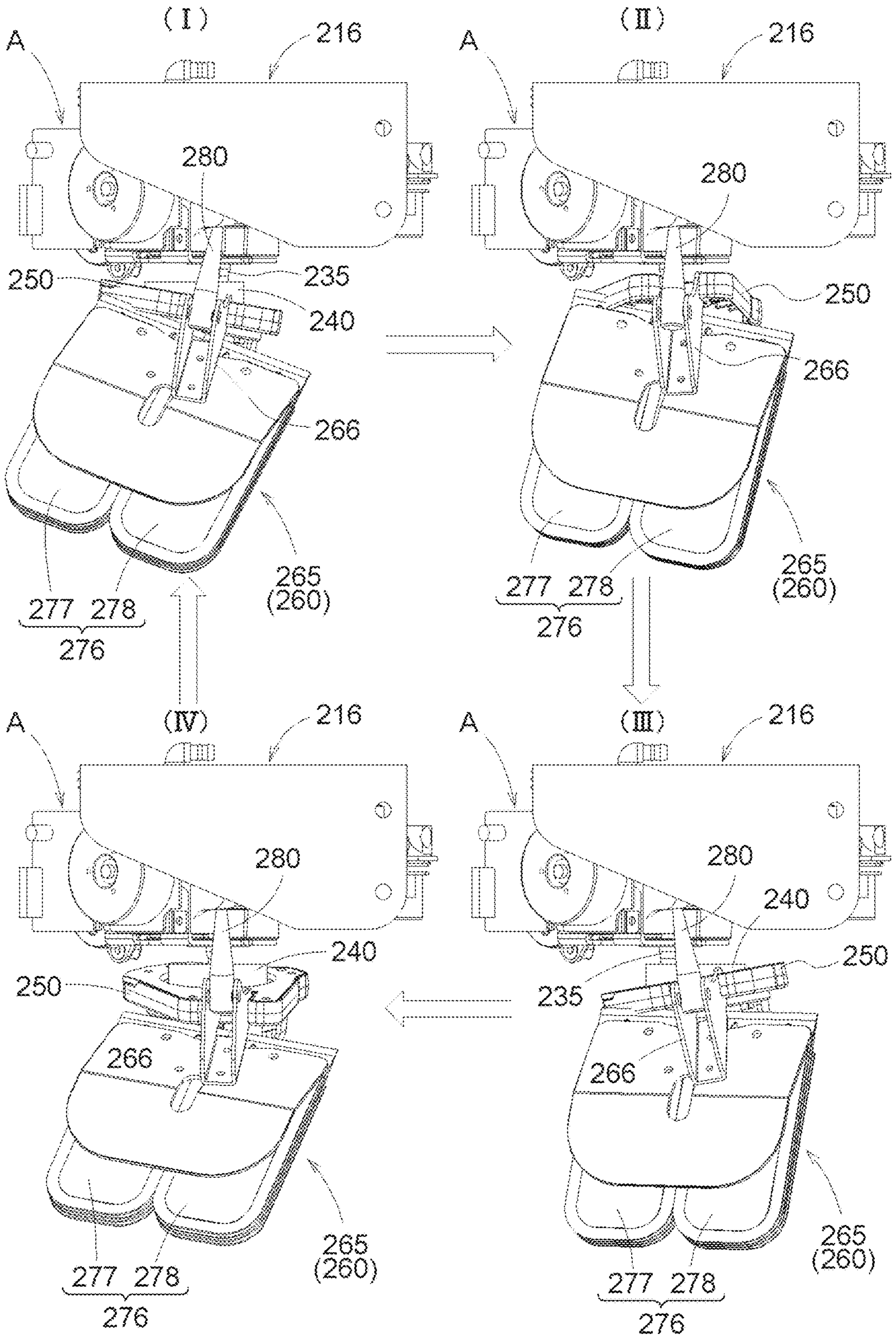
FIG. 13 is view illustrating an operation of the first and second treatment elements.

In this case, as illustrated in FIGS. 11 to 13, when a position where the treatment element holder 250 is located on the rightmost side with respect to the treatment output shaft 235 is set as a rotation reference (0 degrees) ((I) in each of FIGS. 11 to 13), the second treatment element 265 moves as follows. When viewed along the upward-downward direction, as illustrated in FIG. 11, as the treatment output shaft 235 is rotated in a clockwise direction as viewed from below, in conjunction with the movement of the treatment element holder 250, the base end side of the second treatment element 265 passes through the rear side (rotation angle of the treatment output shaft 235 is 90 degrees, FIG. 11(II)), the left side (180 degrees, FIG. 11(III)), and the rear side (270 degrees, FIG. 11(IV)), and moves (circular movement) again to the right side (0 degrees, FIG. 11(I)).

The tip side (the first contact portion 277 and the second contact portion 278) of the second treatment element main body 276 of the second treatment element 265 moves similarly to the base end side. However, due to the operation of the double link mechanism, the movement amount in the forward-rearward direction is smaller than that of the base end side. At the same time, when viewed along the width direction, as illustrated in FIG. 12, the tip side of the second treatment element main body 276 passes through the intermediate position (0 degrees, from (I) in FIG. 12, the lower position (90 degrees, (II) in FIG. 12), the intermediate position (180 degrees, (III) in FIG. 12), and the upper position (270 degrees, (IV) in FIG. 12)), and oscillates so as to reach the intermediate position (0 degrees) again.

Furthermore, when viewed along the forward-rearward direction, as illustrated in FIG. 13, the tip side of the second treatment element main body 276 passes through the right position (0 degree, from FIG. 13(I)), the intermediate position (90 degrees, (II) in FIG. 13), the position (180 degrees, (III) in FIG. 13), and the intermediate position (270 degrees, (IV) in FIG. 13), and oscillates so as to reach the intermediate position (0 degrees) again. However, due to the operation of the double link mechanism, the movement (oscillating amount) in the upward-downward direction is smaller than that of the treatment element holder 250 (first treatment element 261). The movement in the width direction is the same as that of the first treatment element 261.

The above-described upper position means a position on the uppermost side and in the vicinity where the second treatment element main body 276 can be located in the upward-downward direction, and the lower position means a position on the lowermost position and the vicinity where the second treatment element main body 276 can be located in the upward-downward direction. The intermediate position means a position in the middle between the upper position and the lower position. The left position means a position on the leftmost side and the vicinity where the second treatment element main body 276 can be located in the width direction, and the right position means a position on the rightmost position and the vicinity where the second treatment element main body 276 can be located in the width direction. The intermediate position means a position in the middle between the left position and the right position.

As described above, when viewed along the width direction, the first treatment element 261 moves (oscillates) forward and rearward in conjunction with the movement of the treatment element holder 250. The tip side of the second treatment element main body 276 of the second treatment element 265 also oscillates forward and rearward in conjunction with the movement of the treatment element holder 250. However, the movement amount (oscillating amount) is smaller. Accordingly, when viewed along the width direction, a distance between the tip side of the first treatment element 261 and the tip side of the second treatment element main body 276 is changed in accordance with the rotation of the treatment output shaft 235. Then, the first treatment element 261 and the second treatment element main body 276 move in cooperation with each other so that the distance decreases between the mutual tip sides. In this manner, while the shoulder of the treatment receiver is held by the second treatment element main body 276 from the front, the treatment can be performed by causing the first treatment element 261 to press the shoulder of the treatment receiver from above.

In this way, according to a simple configuration of using the first cam 240, the first treatment element 261 and the second treatment element 265 can be caused to oscillate in the upward-downward direction. The movement of the first treatment element 261 and the second treatment element 265 in accordance with the rotation angle of the treatment output shaft 235 is changed depending on a positional relationship between the treatment output shaft 235 and the ball bearing 242 located farthest away from the first treatment motor drive unit 230.

Next, a case where the second treatment motor 331 is further operated will be additionally described. If the second treatment motor 331 is operated, the speed is reduced by the second reduction gear 337, and the pulley **337*b* is rotated. Since the pulley 337*b* is rotated, the cam main body 344 of the second cam 340 and the inner ring of the ball bearing 342** are integrally rotated.

As described above, the cam main body 344 of the second cam 340 is formed in a cylindrical shape extending along the axis X, and is attached in a state of being eccentric from the axis Y of the pulley **337*b*. Accordingly, in accordance with the rotation of the pulley 337*b*, the axis of the cam main body 344 of the second cam 340 revolves around the axis Y. That is, the substructure 234 is in a relatively fixed relationship with the second cam 340. In this manner, the substructure 234, the first cam 240 connected thereto via the treatment output shaft 235 of the first treatment motor drive unit 230, the treatment element holder 250, and the first treatment element 261 and the second treatment element 265 of the treatment element holder 250** are rotated (revolve) eccentrically with respect to the axis Y parallel to the axis X.

An eccentric amount from the axis Y of the cam main body 344 of the second cam 340, that is, a distance from the axis X to the axis of the cylinder of the cam main body 344 may be set to be larger than an eccentric amount from the axis Y of the cam main body 244 of the first cam 240, that is, a distance from the axis X to the axis of the cylinder of the cam main body 244. In this manner, the operation of the first cam 240 can correspond to the operation imitating the movement of the wrist of the treatment giver. On the other hand, the operation of the second cam 340 can correspond to the operation imitating the movement of the elbow of the treatment giver.

In this way, according to a simple configuration of using the first cam 240 and the second cam 340, while the first treatment element 261 and the second treatment element 265 oscillate in the upward-downward direction (direction along the axis X), both of these can further revolve (oscillate) with respect to the axis Y parallel to the axis X. That is, while the first treatment element 261 and the second treatment element 265 oscillate in the direction along the upward-downward direction (direction along the axis X), a so-called twisting effect of causing both of these to be greatly displaced in the direction intersecting the upward-downward direction.

Next, the movement of the first treatment element 261 and the second treatment element 265 in a state where the treatment receiver sits on the massage machine 1 will be described. First, in the state where the treatment receiver sits on the seat unit 11 of the massage machine 1, the shoulder treatment mechanism 200 supported by the upward and downward moving arm 15 is aligned with the shoulder position. Specifically, the first treatment element 261 is located in the upper portion of the shoulder, and the second treatment element 265 is located in the front portion of the shoulder. Thereafter, the inflatable bag 228 is inflated.

If the inflatable bag 228 is inflated, a force (biasing force) is generated in the direction in which the bottom portion 212 of the first base 211 and the bottom portion 217 of the second base 216 are separated from each other. In this manner, the second base 216 pivots around the joint pin penetrating the joint holding through-hole 211*a* as the pivot axis. The right side of the second base 216 is pressed down so as to be away from the first base 211. The first treatment element 261 presses the shoulder of the treatment receiver from above.

While the second treatment element 265 holds the shoulder of the treatment receiver from the front by using the biasing force generated by inflating the inflatable bag 228, the first treatment element 261 presses the shoulder of the treatment receiver from above. Accordingly, the first treatment element 261 and the second treatment element 265 are not separated from the shoulder of the treatment receiver due to the oscillation in the upward-downward direction and the direction intersecting the upward-downward direction. Therefore, while the shoulder is always held, the shoulder can be pressed from above.

During a period that the shoulder is pressed from above by the first treatment element 261, due to the oscillation of the first treatment element 261 in the upward-downward direction, the revolution of the first treatment element 261, and the biasing force of the inflatable bag 228, the force or the pressing orientation of the first treatment element 261 to press the shoulder of the treatment receiver can be periodically changed. Accordingly, it is possible to obtain a satisfactory treatment effect which is similar to the treatment performed by the fingers of the treatment giver, or which is superior to the treatment performed by the fingers of the treatment giver.

Therefore, in the shoulder treatment mechanism 200 and the massage machine 1 using the same according to the present embodiment, when the first treatment element 261 performs the treatment by pressing the treatment target site, the treatment can be further performed by adding the displacement along the direction intersecting the pressing direction to the treatment target site pressing.

In addition, the first treatment element 261 and the second treatment element 265 move in the forward-rearward direction and the rightward-leftward direction. Accordingly, not only a specific site but also the surrounding of the shoulder of the treatment receiver can be pressed. Therefore, it is possible to further improve the treatment effect obtained by the pressing.

Separately from the movement in the forward-rearward direction and the rightward-leftward direction, the second treatment element 265 can cause the inflatable bags 277*a* and 278*a* of the first contact portion 277 and the second contact portion 278 to press the shoulder from the front. Therefore, it is possible to further improve the treatment effect or the holding effect obtained by the pressing.

In the shoulder treatment mechanism 200 according to the present embodiment, as described above, while the first treatment element 261 moves in the forward-rearward direction and the rightward-leftward direction so to perform a so-called circular movement (refer to FIG. 11), the first treatment element 261 and the second treatment element 265 repeatedly move close to or move away from each other in the forward-rearward direction by using the double link mechanism (refer to FIG. 12). Furthermore, a twisting effect can be added to these operations. Accordingly, not only the shoulder can be pressed, but also the shoulder muscles such as the levator scapulae muscle and a superior part of the trapezius muscle can be relaxed by gripping and kneading the shoulder. The trapezius muscle is a thick and strong muscle, but the levator scapulae muscle is a thin and weak muscle. In particular, women or persons having low shoulders have the weak levator scapulae muscle. Accordingly, the muscles are likely to be brought into a state of tension tense, and thus, they easily have the stiff shoulder.

Therefore, according to the shoulder treatment mechanism 200, the treatment output shaft 235 extending in the upward-downward direction is circularly moved. Furthermore, the first treatment element 261 is circularly moved around the treatment output shaft 235. In this manner, the movement of the arm or the fingers of the treatment giver during the kneading, and the rotation of the thumb finger are reproduced. In this manner, a little wider range is pressed compared to the acupressure. Accordingly, the shoulder muscles such as the levator scapulae muscle and the superior part of the trapezius muscle can be relaxed. In this case, the second treatment element 265 grips and supports the shoulder so that the body of the treatment receiver does not escape when the kneading operation is performed by the first treatment element 261. That is, the second treatment element 265 grips the shoulder muscles of the treatment receiver when the first treatment element 261 and the second treatment element 265 move close to each other, and supports the body of the treatment receiver when both of these move away from each other. In this manner, it is possible to effectively relax the shoulder muscles of the treatment receiver.

The movement of the upward and downward moving arms 15 respectively provided on the right and left side surfaces 14 of the backrest unit 12 in the upward-downward direction and the movement of the shoulder treatment mechanisms 200 in the width direction can be performed independently of each other. In addition, with regard to the first treatment motors 231 of the right and left shoulder treatment mechanisms 200, only one of the first treatment motors 231 can be driven, or the first treatment motors 231 can have mutually different rotation speeds. In addition, with regard to the second treatment motors 331 of the right and left shoulder treatment mechanisms 200, only one of the second treatment motors 331 can be driven, or the second treatment motors 331 can have mutually different rotation speeds. That is, the first treatment motor 231 and the second treatment motor 331 can be respectively and independently controlled. In this manner, in a case where the right and left shoulder heights differ depending on an individual difference in the treatment receivers, in a case where the pressing position or the pressing force desired by the treatment receiver differs depending on the right and left shoulders, or in a case where the treatment receiver wants to receive the treatment on only one of the right and left shoulders, it is possible to easily cope with the cases.

(2) Other Embodiments (a) In the above-described embodiment, a case where the treatment element holder 250 is connected to the first cam 240 of the first drive unit A and the first cam 240 (first drive unit A) is connected to the second cam 340 of the second drive unit B has been described as an example. However, the connection among the treatment element holder 250, the first drive unit A, and the second drive unit B is not limited to the above-described aspect. An aspect may be adopted in which the treatment element holder 250 is connected to the second cam 340 of the second drive unit B and the second cam 340 (second drive unit B) is connected to the first cam 240 of the first drive unit A.

(b) In the above-described embodiment, a case where the first drive unit A has the first treatment motor drive unit 230 and the first cam 240 and the first treatment motor drive unit 230 has the first treatment motor 231 has been described as an example. In addition, a case where the second drive unit B has the second treatment motor drive unit 330 and the second cam 340 and the second treatment motor drive unit 330 has the second treatment motor 331 has been described as an example. However, instead of having the first treatment motor 231 and the second treatment motor 331 separately, the first drive unit A and the second drive unit B can share one treatment motor. In this case, the first treatment motor drive unit 230 and the second treatment motor drive unit 330 can share one treatment motor. A configuration can be adopted by providing one treatment motor drive unit including a function of the first treatment motor drive unit 230 and a function of the second treatment motor drive unit 330. In this manner, the first cam 240 of the first drive unit A and the second cam 340 of the second drive unit B may be driven using one treatment motor.

(c) In the above-described embodiment, the following case has been described as an example. The inflatable bag 228 which is an example of the third drive unit C is attached between the bottom portion 212 of the first base 211 and the bottom portion 217 of the second base 216. The force (biasing force) acting in the direction away from the first base 211 along the axis X is applied to the tip side of the second base 216. The biasing force is adjusted by the inflating amount corresponding to the air supply amount to be supplied to the inflatable bag 228. However, instead of the inflatable bag 228, the third drive unit C may adopt an elastic member such as a coil spring. In a case where the coil spring is adopted instead of the inflatable bag 228, the above-described biasing force is constant.

(d) In the above-described embodiment, the following case has been described as an example. The inflatable bag 228 which is an example of the third drive unit C is attached between the bottom portion 212 of the first base 211 and the bottom portion 217 of the second base 216. The force (biasing force) acting in the direction away from the first base 211 is applied to the tip side of the second base 216. However, the third drive unit C can also adopt a motor instead of the inflatable bag 228.

(e) In the above-described embodiment, the following aspect has been described as an example. While the shoulder of the treatment receiver is held from the front by the second treatment element 265 of the shoulder treatment mechanism 200, the first treatment element 261 presses the shoulder of the treatment receiver from above. However, a relationship between the second treatment element 265 and the first treatment element 261 in the shoulder treatment mechanism 200 is not limited to this aspect described as the example. For example, an aspect can be adopted as follows. While the shoulder of the treatment receiver is held from above by the second treatment element 265, the first treatment element 261 presses the shoulder of the treatment receiver from behind. In addition, another aspect can be adopted as follows. While the shoulder of the treatment receiver is held from the front by the second treatment element 265, the first treatment element 261 presses the shoulder of the treatment receiver from behind.

(f) In the above-described embodiment, as an example of the treatment unit, a case has been described where the massage machine 1 has the shoulder treatment mechanism 200 for treating the shoulder. However, in the massage machine 1, instead of or in addition to the shoulder treatment mechanism 200, the backrest unit 12 can have a back treatment mechanism 300 (refer to FIGS. 14 and 15) for treating the back of the treatment receiver, as the treatment unit. In this case, in addition to the mechanism the same as the shoulder treatment mechanism 200, the back treatment mechanism 300 can integrally include a roller R facing the back of the treatment receiver. In this manner, the roller R is rotated in conjunction with the upward and downward movement of the back treatment mechanism, and the back treatment mechanism 300 can be smoothly moved upward and downward along the back of the treatment receiver. In this case, in the back treatment mechanism 300, the first treatment element 261 is located inside (on the right side), and the second treatment element 265 is located outside (on the left side) with respect to the back surface of the treatment receiver. In this manner, the treatment can be performed as if the person (treatment giver) performs the treatment on the treatment receiver.

Figure 14:
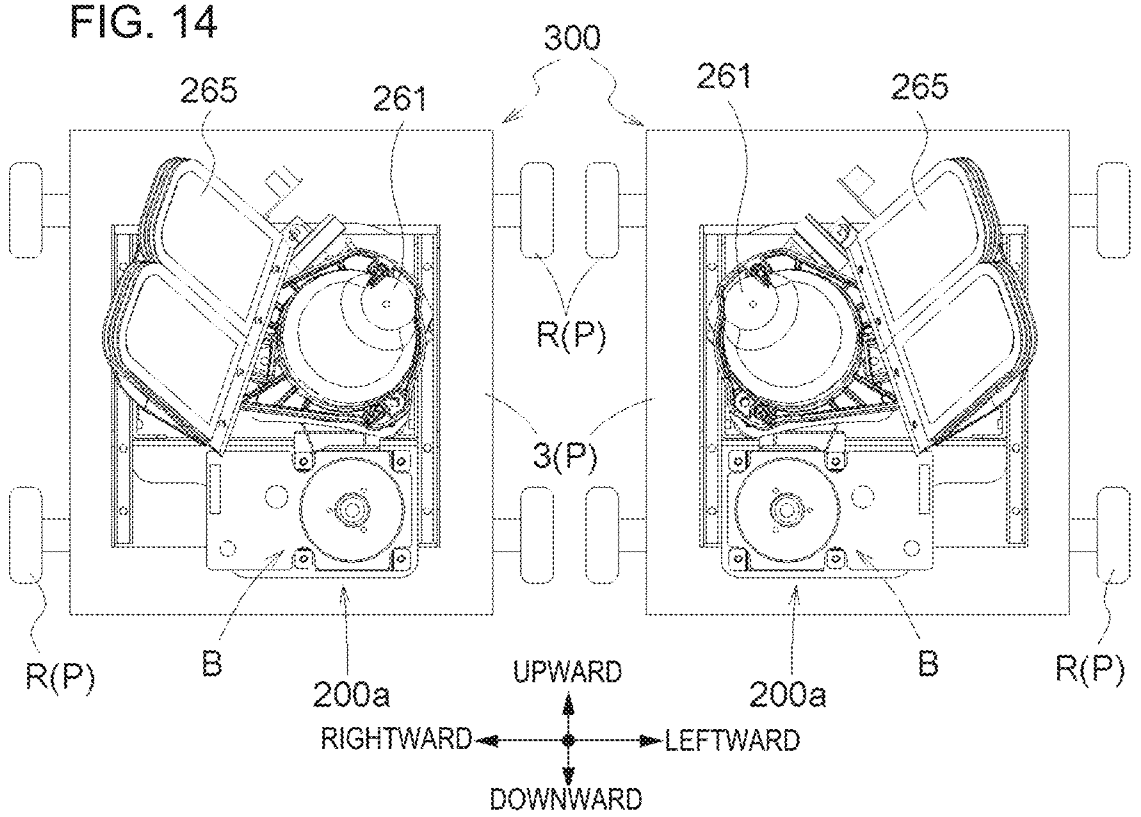
FIG. 14 is a view for describing a form of a back treatment mechanism.

Referring to FIG. 14, an example of the back treatment mechanism 300 will be described. The back treatment mechanism 300 is disposed as a pair of right and left units as illustrated in FIG. 14, for example. The back treatment mechanism 300 has a pair of right and left rectangular support plates 3. In the support plate 3 having the rollers R which are disposed at four corners of the support plate 3 and which are rotating bodies (in the present embodiment, a cylindrical shape having a predetermined thickness in the rightward-rightward direction and having the rotation axis in the rightward-rightward direction) rolling along the upward-downward direction, one unit 200*a* having the mechanism the same as the shoulder treatment mechanism 200 is provided. For convenience of the description, in the unit 200*a*, the same reference numerals will be given to same structural elements the same as those of the shoulder treatment mechanism 200.

The roller R is the rotating body rotated around the rotary shaft axially supported by the support plate 3 as the rotation axis. The roller R rolls in a state of facing the back of the treatment receiver, and moves the back treatment mechanism 300 along the upward-downward direction.

In the present embodiment, a case where the first base 211 of the unit 200*a* is fixed to the support plate 3 by using a screw is will be described with reference to FIG. 14. In the following description of the embodiment, the unit 200*a* on the left side (for performing the treatment on a left side region of the back) of the massage machine 1 will be described. The massage machine 1 has symmetrical shapes on the right side and the left side. Accordingly, a shape of the unit 200*a* on the right side will be omitted in the description. In addition, the unit 200*a* can be operated similarly to the shoulder treatment mechanism 200, and thus, these similar operations will be omitted in the description.

In the unit 200*a*, the first treatment element 261 is located on the inner side (right side position) of the back of the treatment receiver, and the second treatment element 265 is located on the outer side (left side position) of the back of the treatment receiver. That is, with respect to the first treatment element 261, the second treatment element 265 is located at a position relatively displaced to the outer side of the back. In a state where the treatment receiver sits on the massage machine 1 and leans against the backrest unit 12, the first treatment element 261 and the second treatment element 265 in the unit 200*a* come into contact with the back of the treatment receiver.

In a state where the treatment receiver leans against the backrest unit 12, the back treatment mechanism 300 is moved upward and downward by the roller R. In this manner, the unit 200*a* can perform the treatment in a wide range from the upper part to the lower part of the back of the treatment receiver. The back treatment mechanism 300 can be moved upward and downward, for example, in a range from the lower part of the shoulder (upper part of the back) to the position of the waist (lower part of the back).

The right and left units of the back treatment mechanism 300 can be respectively and separately (independently) moved upward and downward. In this way, the treatment receiver can enjoy the treatment as if a person (treatment giver) performs the treatment on different sites by separately using the right and left hands.

FIG. 14 illustrates a case where the right and left units of the back treatment mechanism 300 are paired. However, two or more pairs can be used. In this case, the respective units can be located at positions which do not overlap each other in the upward-downward direction. For example, the units can be located in four rows in the rightward-leftward direction.

In addition, the units on the left side or on the right side can be located at positions overlapping each other upward and downward on each side. For example, the back treatment mechanisms 300 can be arranged upward and downward in two rows, and can be used as the back treatment mechanism 300 on the upper side and as the back treatment mechanism 300 on the lower side.

Figure 15:
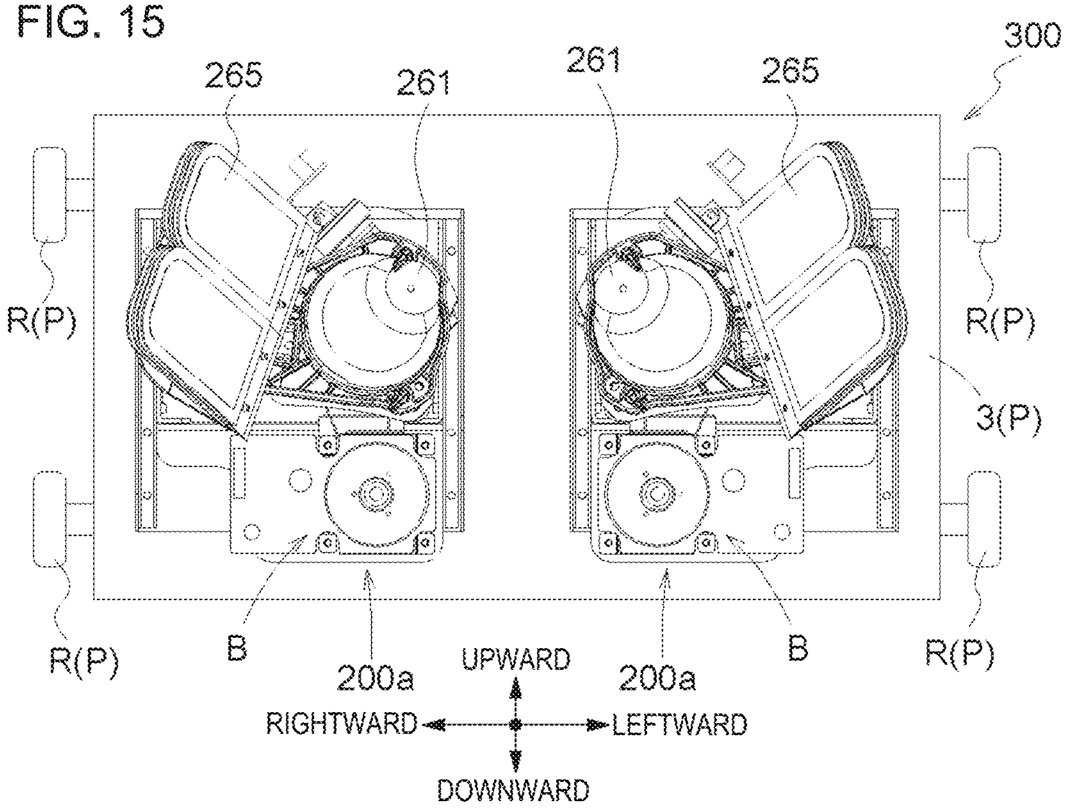
FIG. 15 is a view for describing another form of the back treatment mechanism.

Referring to FIG. 15, another example of the back treatment mechanism 300 will be described. The back treatment mechanism 300 in the case illustrated in FIG. 15 is different from that in the case illustrated in FIG. 14 in that a pair of units 200*a* is disposed in one rectangular support plate 3. The other configurations are the same as each other.

As illustrated in FIG. 15, in a case where the pair of units 200*a* is disposed in the one rectangular support plate 3, in accordance with the upward and downward movement of the one rectangular support plate 3, the pair of units 200*a* can move upward and downward so as to perform the treatment on the back of the treatment receiver. In this case, the unit 200*a* can also perform the treatment in a wide range from the upper part to the lower part of the back of the treatment receiver. The back treatment mechanism 300 can be moved upward and downward, for example, in a range from the lower part of the shoulder (upper part of the back) to the position of the waist (lower part of the back).

(g) In the above-described embodiment, a case where as an example of the treatment unit, the massage machine 1 has the shoulder treatment mechanism 200 for performing the treatment on the shoulder has been described as an example. However, instead of or in addition to the shoulder treatment mechanism 200, the massage machine 1 can have other treatment mechanisms (not illustrated) for performing the treatment on each body part of the treatment receiver, for example, such as the neck, the arms (upper arm and forearm), the back or the waist, the buttocks, the legs (thighs and calves) or the feet (hereinafter, referred to as each body part in some cases).

Figure 16:
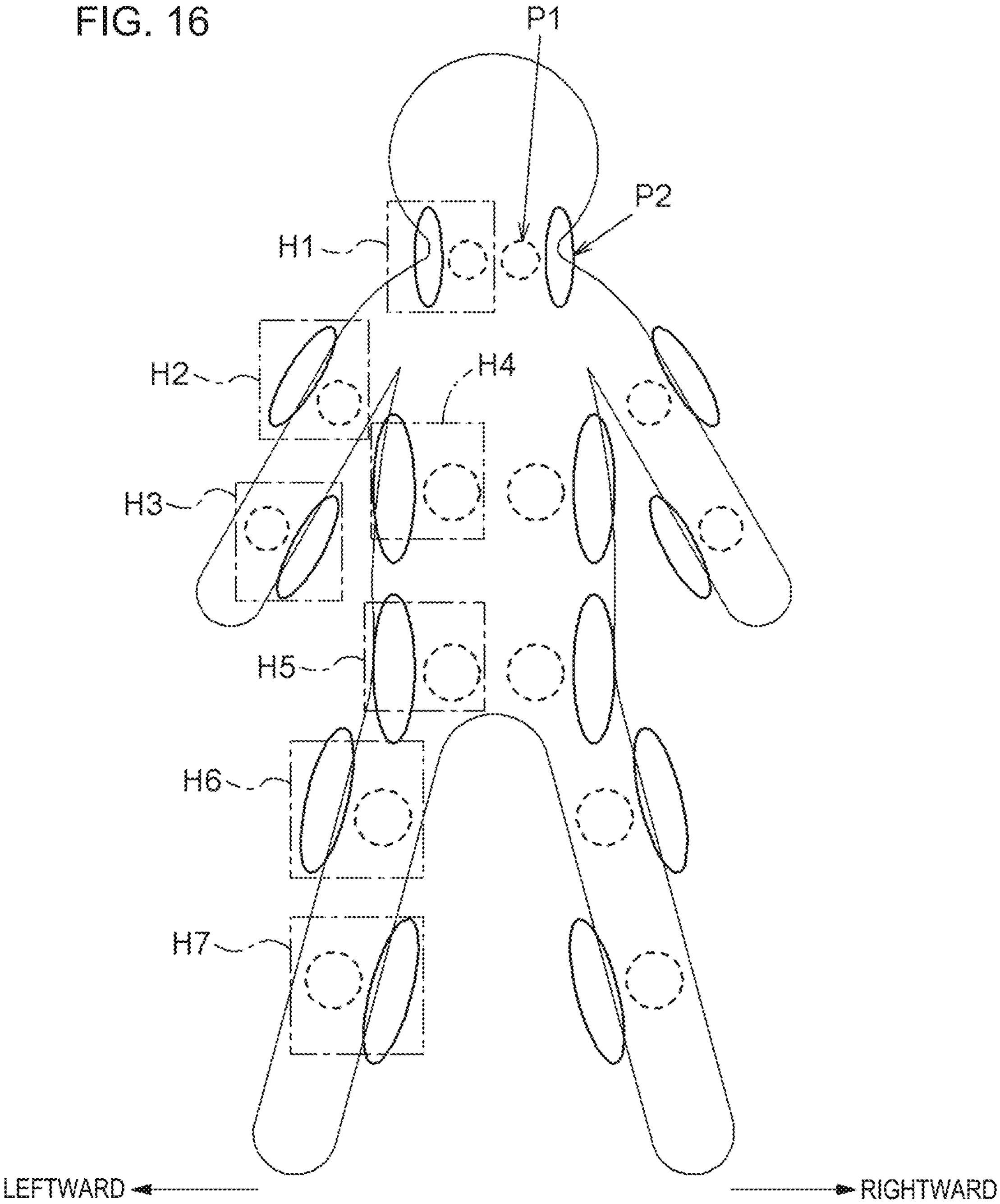
FIG. 16 is a view illustrating treatment target sites of the first treatment element and the second treatment element (in a case of a whole body).
Figure 17:
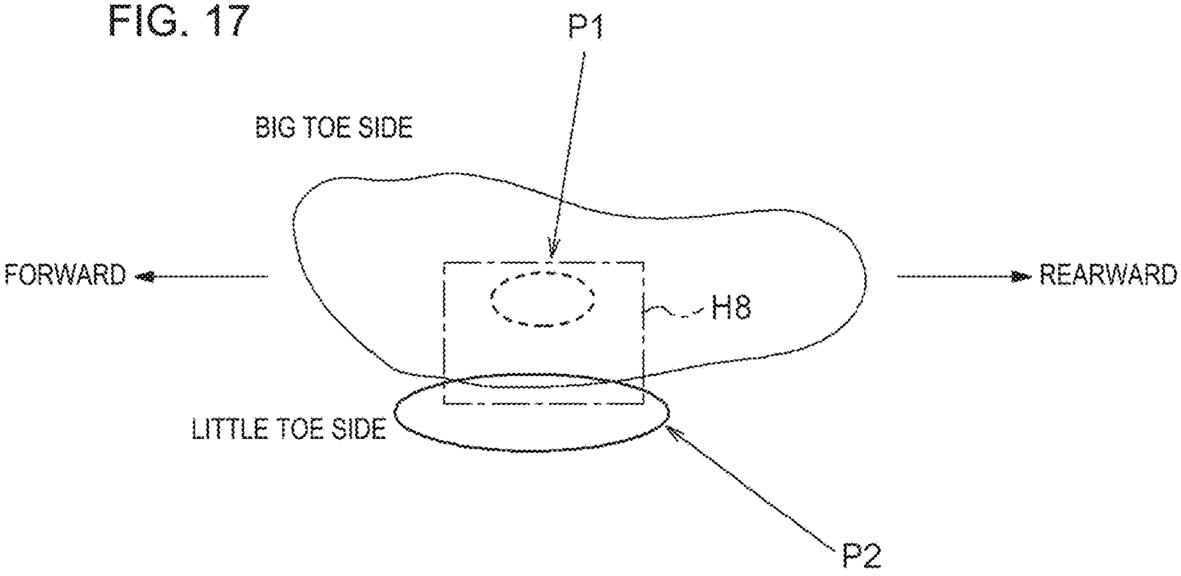
FIG. 17 is a view illustrating a treatment target site of the first treatment element and the second treatment element (in a case of a sole of a right foot).
Figure 18:
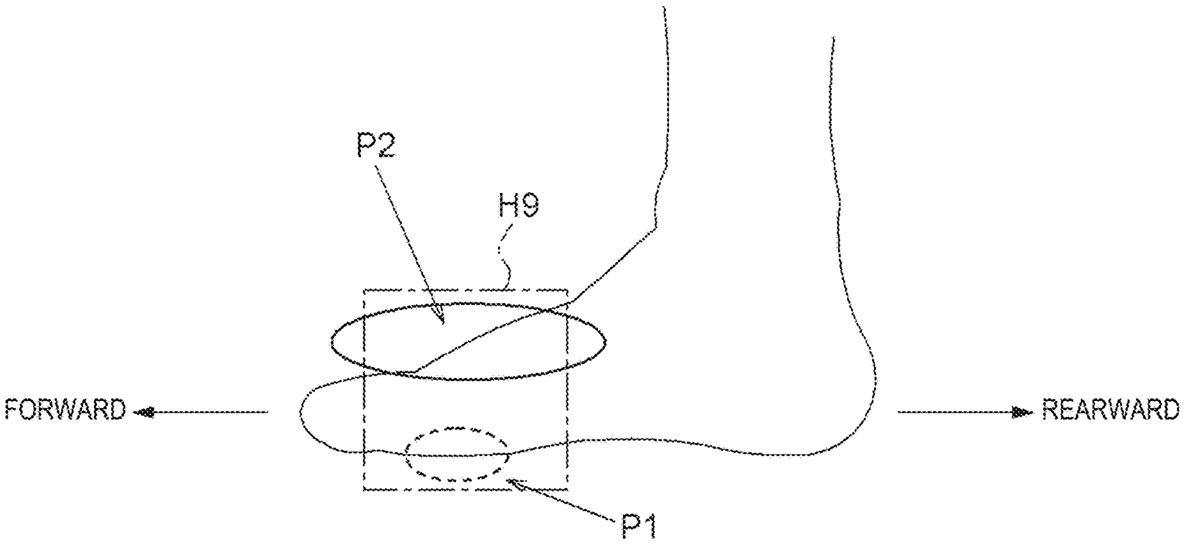
FIG. 18 is a view illustrating a treatment target site of the first treatment element and the second treatment element (in a case of a left side surface of the right foot).

In this case, the treatment mechanism can be properly located for each body part of the treatment receiver. Specifically, as illustrated in FIGS. 16 to 18, for the neck, the arms (upper arm and forearm), the back or the waist, the buttocks, and the legs (thighs and calves) (refer to FIG. 16) or the feet (refer to FIGS. 17 and 18) of the treatment receiver, the first treatment element 261 is located on the inner side (right side), and the second treatment element 265 is located on the outer side (left side). In this manner, the treatment can be performed as if a person (treatment giver) performs the treatment on the treatment receiver.

FIG. 16 schematically illustrates a case of performing treatment on each body part of a person. In FIG. 16, the first treatment element 261 is brought into contact with the site P1 indicated by an arc drawn using a broken line. In FIG. 16, the second treatment element 265 is brought into contact with a site P2 indicated by an arc drawn using a solid line.

In a case illustrated in FIG. 16, the second treatment element 265 is located outside the body (outside the region of the body in FIG. 16) in a rear view (front view when viewed from the rear surface of the body) of the body of the person, and the first treatment element 261 is located inside the body (inside the region of the body in FIG. 16). In this manner, in a state where the four fingers are located outside the body and the thumb is located inside the body, the treatment can be performed on each body part of the treatment receiver, as if the treatment giver performs the treatment.

A neck portion H1, an upper arm portion H2 of the arm, a forearm portion H3 of the arm, a back portion H4 which is the back or the waist portion, a buttock portion H5 of the hip, a thigh portion H6 of the legs, and a calf portion H7 are illustrated as an example in FIG. 16. An aspect will be additionally described as an example in which units for performing the treatment on these portions are disposed in the massage machine 1.

Hereinafter, in a case of describing each body part of the treatment receiver, the ventral side of the treatment receiver will be defined as "forward", the dorsal side will be defined as "rearward", the right hand side will be defined as "rightward", the left hand side will be defined as "leftward", the head side will be defined as "upward", and the foot side will be defined as "downward". The direction parallel to the shoulder width direction of the treatment receiver will be defined as the "rightward-leftward direction", the direction parallel to the direction from the front to the rear will be defined as the "forward-rearward direction", and the direction perpendicular to both the width direction and the forward-rearward direction will be defined as the "upward-downward direction". In addition, in the following description, in a case where the directions such as "leftward" or "rightward in the "rightward-leftward direction", "forward" or "rearward" in the "forward-rearward direction", and "upward" or "downward" in the "upward-downward direction" are described without any special notes, the respective directions may be sometimes simply referred to as "leftward" or "rightward", "forward" or "rearward", and "upward" or "downward". For example, the right side and rightward in the rightward-leftward direction may be simply referred to as the "right side" or "rightward".

The body of the person has a symmetrical shape on the right side and the left side. Accordingly, with regard to the neck portion H1, the upper arm portion H2 of the arm, the forearm portion H3 of the arm, the back portion H4, the buttock portion H5 of the hip, the thigh portion H6 of the legs, and the calf portion H7, only the left side of the body of the treatment receiver will be described, and the right side of the body will be omitted in the description.

In a case of performing the treatment on the neck portion H1, the second treatment element 265 is located on the outer side (left side surface) of the neck portion H1, and the first treatment element 261 is located on the inner side (rear surface side). In a case of disposing the unit for performing the treatment on the neck portion H1 in the massage machine 1, for example, the unit is disposed in the upper portion or the upper end portion of the backrest unit 12. The unit is located so that the first treatment element 261 and the cover 257 come into contact with the inner side of the neck portion H1 and the second treatment element 265 comes into contact with the outer side of the neck portion H1.

In a case of performing the treatment on the upper arm portion H2, the second treatment element 265 is located on the outer side (left side surface) of the upper arm portion H2, and the first treatment element 261 is located on the inner side (rear surface side). In a case of disposing the unit for performing the treatment on the upper arm H2 in the massage machine 1, for example, the unit is disposed on the side portion (left side portion) or the side surface 14 (refer to FIG. 1) of the backrest unit 12. The unit is located so that the first treatment element 261 and the cover 257 come into contact with the inner side of the upper arm H2 and the second treatment element 265 comes into contact with the outer side of the upper arm H2.

In a case of performing the treatment on the forearm portion H3, the second treatment element 265 is located on the outer side (for example, the right side surface) of the forearm portion H3, and the first treatment element 261 is located on the inner side (rear surface side). In a case of disposing the unit for performing the treatment on the forearm portion H3 in the massage machine 1, for example, the unit is disposed in an armrest unit 16 (refer to FIG. 1). The unit is located so that the first treatment element 261 and the cover 257 come into contact with the inner side of the forearm portion H3 and the second treatment element 265 comes into contact with the outer side of the forearm portion H3. For the forearm portion H3, the unit may be located so that the second treatment element 265 comes into contact with the left side surface.

In a case of performing the treatment on the back portion H4, the second treatment element 265 is located on the outer side (left side surface) of the back portion H4, and the first treatment element 261 is located on the inner side (rear surface side). In a case of disposing the unit for performing the treatment on the back portion H4 in the massage machine 1, for example, the unit is disposed in the backrest unit 12. The unit is located so that the first treatment element 261 and the cover 257 come into contact with the inner side of the back portion H4 and the second treatment element 265 comes into contact with the outer side of the back portion H4. In this case, as the unit for performing the treatment on the back portion H4, it is preferable that the massage machine 1 adopts the above-described back treatment mechanism 300 (refer to FIGS. 14 and 15).

In a case of performing the treatment on the buttock portion H5, the second treatment element 265 is located on the outer side (left side surface) of the buttock portion H5, and the first treatment element 261 is located on the inner side (rear surface side). In a case of disposing the unit for performing the treatment on the buttock portion H5 in the massage machine 1, for example, the unit is disposed in the lower end portion of the backrest unit 12 or the seat unit 11 (refer to FIG. 1). The unit is located so that the first the treatment element 261 and the cover 257 come into contact with the inner side of the buttock portion H5 and the second treatment element 265 comes into contact with the outer side of the buttock portion H5.

In a case of performing the treatment on the thigh portion H6, the second treatment element 265 is located on the outer side (left side surface) of the thigh portion H6, and the first treatment element 261 is located on the inner side (rear surface side). In a case of disposing the unit for performing the treatment on the thigh portion H6 in the massage machine 1, for example, the unit is disposed in the front end portion of the seat unit 11 or an upper end portion (refer to FIG. 1) of a leg unit 17. The unit is located so that the first treatment element 261 and the cover 257 come into contact with the inner side of the thigh portion H6 and the second treatment element 265 comes into contact with the outer side of the thigh portion H6. For the thigh portion H6, the unit may be located so that the second treatment element 265 comes into contact with the right side face.

In a case of performing the treatment on the calf portion H7, the second treatment element 265 is located on the outer side (for example, the right side surface) of the calf portion H7, and the first treatment element 261 is located on the inner side (rear surface side). In a case of disposing the unit for performing the treatment on the calf portion H7 in the massage machine 1, for example, the unit is disposed in a recessed portion 17*a* of the leg unit 17. The unit is located so that the first treatment element 261 and the cover 257 come into contact with the calf portion H7 and the second treatment element 265 comes into contact with the outer side of the thigh portion H6. For the calf portion H7, the unit may be located so that the second treatment element 265 comes into contact with the left side face.

As illustrated in FIGS. 17 and 18, in a case of performing the treatment on the foot sole or the foot side surface of the foot of the treatment giver, the foot unit can be disposed in the lower end or on the lower side of the leg unit 17 (refer to FIG. 1), and the treatment unit can be disposed in the leg unit.

FIG. 17 schematically illustrates a case of performing the treatment on the sole of the right foot of the body of the person (hereinafter, referred to as the foot sole). In FIG. 17, the first treatment element 261 is brought into contact with the site P1 indicated by the arc drawn using the broken line. In FIG. 17, the second treatment element 265 is brought into contact with the site P2 indicated by the arc drawn using the solid line.

In a case illustrated in FIG. 17, the second treatment element 265 is located on the outer side (right side surface) of the foot sole in a front view with respect to the foot sole, and the first treatment element 261 is located on the inner side. In this manner, in a state where the four fingers are located outside the foot sole of the treatment receiver in a front view and the thumb is located inside the foot sole, the treatment can be performed as if the person (treatment giver) performs the treatment. An aspect can be adopted in which the second treatment element 265 is located on the left side surface of the foot sole.

FIG. 18 illustrates the left side surface of the right foot. FIG. 18 schematically illustrates a case of performing the treatment on the right foot of the body of the person. In FIG. 18, the first treatment element 261 is brought into contact with the site P1 indicated by the arc drawn using broken line. In FIG. 18, the second treatment element 265 is brought into contact with the site P2 indicated by the arc drawn using the solid line.

In a case illustrated in FIG. 18, the treatment element 260 of the treatment mechanism is in contact with the right side surface of the right foot. Then, the second treatment element 265 is located on the instep side of the right foot, and the first treatment element 261 is located in the foot sole. In this manner, in a state where the four fingers are located on the instep side of the foot of the treatment receiver and the thumb is located in the foot sole, the treatment can be performed as if the person (treatment giver) performs the treatment.

The first treatment element 261 can be located on the outer side in a front view for the arm or the leg of the treatment receiver, and the second treatment element 265 can be located on the inner side in the front view.

(h) In the above-described embodiment, a case where the treatment is performed on the shoulder of the treatment receiver by disposing the shoulder treatment mechanism 200 serving as the treatment unit in the massage machine 1 which is a so-called massage chair has been described as an example. However, the embodiment is not limited to the case where the treatment unit is disposed in the massage machine 1 which is the massage chair.

For example, the treatment unit can also be used as follows. One end of the treatment unit is fixed to the ground, and one, two, or more joint portions serving as a so-called robot arm driven by an instruction drive unit is disposed on the other end side of the fixed end portion. In this manner, the treatment unit can be used in performing the treatment on any desired site of the body or the entire body of the treatment receiver, including the shoulder, the back, the neck, the arms, and the legs. For example, in a state where the treatment receiver lies on the bed, the treatment unit is disposed in the other end of the robot arm whose one end is fixed to the bed. In this manner, the treatment unit can perform the treatment on the body of the treatment receiver.

In this case, the robot arm is provided with a control unit operated in accordance with an instruction of the treatment giver. The control unit controls the robot arm, based on the instruction of the treatment giver. In this manner, the treatment can be performed on the treatment receiver. For example, the treatment receiver instructs the control unit to perform desired treatment on the control receiver with regard to which site of the body of the treatment receiver needs the treatment, how to perform the treatment on the treatment receiver, and which sequence the treatment receiver wants to receive. In this manner, the robot arm is driven by the control unit so that the treatment unit can perform the treatment on the desired site of the treatment receiver.

(i) In the above-described embodiment, the following cases have been described as an example. The shoulder treatment mechanism 200 serving as the treatment unit is disposed in the massage machine 1 which is a so-called massage chair so as to perform the treatment on the shoulder of the treatment receiver. The shoulder treatment mechanism 200 is suspended from and fixed to the upward and downward moving arm 15 of the massage machine 1 via the base 210. However, the embodiment is not limited to the case where the treatment unit is fixed to the furniture or the structure such as the massage machine 1 which is the massage chair.

For example, a gripping unit for the treatment receiver or the treatment giver to grip the treatment unit can be disposed in the base 210 of the treatment unit having a structure similar to that of the shoulder treatment mechanism 200. In this manner, the treatment unit can be used as a portable (handy type) treatment device.

In a case of the portable treatment device, the treatment receiver grips the gripping unit of the treatment device. In this manner, the treatment receiver can perform the treatment for himself or herself by moving the treatment device to any desired site of the body including the shoulder, the back, the neck, the arms, the legs, and the feet.

In addition, in the case of the portable treatment device, similarly, the treatment giver grips the gripping unit of the treatment device. In this manner, the treatment giver can perform the treatment for the treatment receiver by moving the treatment device to any desired site of the body including the shoulder, the back, the neck, the arms, the legs, and the feet of the treatment receiver.

The present invention is applicable to the treatment unit and the massage machine.

It should be understood that the invention is not limited to the above-described embodiment, but may be modified into various forms on the basis of the spirit of the invention. Additionally, the modifications are included in the scope of the invention.

What is claimed is:

1. A treatment unit comprising:

a treatment part including a treatment element;

a first drive unit including a first motor, first reduction gear and a swash plate eccentric cam, a first output shaft of the first motor is connected to the first reduction gear that comprises a treatment output shaft and is configured to rotate the treatment output shaft about a first axis, the treatment output shaft is connected to the swash plate eccentric cam, the first output shaft is configured to rotate the swash plate eccentric cam via the first reduction gear and the treatment output shaft and is configured to oscillate the treatment part in a direction of the first axis; and a second drive unit including a second motor, a second reduction gear and an eccentric cam, a second output shaft of the second motor is configured to rotate the eccentric cam via the second reduction gear about a second axis;

wherein the second drive unit is connected to the first drive unit via the eccentric cam of the second drive unit; and wherein the first axis and the second axis are in parallel; and the treatment part is configured to revolve about the second axis.

2. The treatment unit according to claim 1, wherein the swash plate eccentric cam and the eccentric cam each independently include a drive source.

3. The treatment unit according to claim 1, further comprising:

a third drive unit configured to move the treatment part, wherein the third drive unit is connected to the first drive unit or the second drive unit.

4. The treatment unit according to claim 1, wherein the treatment element includes a first treatment element and a second treatment element, the first and the second treatment elements are configured to move close to each other or to move away from each other.

5. The treatment unit according to claim 4, wherein a tip portion of the second treatment element is diverged into a plurality of limbs.

6. The treatment unit according to claim 1, wherein a tip portion of the treatment element comprises an inflatable bag.

7. The treatment unit according to claim 1, wherein a distance between an axis of the second shaft and an axis of a cylinder of the eccentric cam is larger than a distance between an axis of the first shaft and an axis of a cylinder of the swash plate eccentric cam.

8. A massage machine comprising:

the treatment unit according to claim 1, wherein the treatment part is for use of performing treatment on a shoulder of a treatment receiver.

9. A massage machine comprising:

the treatment unit according to claim 1, wherein the treatment part is for use of performing treatment on a back of a treatment receiver.

10. The massage machine according to claim 9, further comprising:

a roller that is configured to face the back is formed integrally with the treatment unit, wherein the roller is configured to move upward and downward along the back while the roller is rotated in accordance with an upward and downward movement of the treatment unit.

* * * * *